US009495581B2

(12) United States Patent
Winnemoeller et al.

(10) Patent No.: US 9,495,581 B2
(45) Date of Patent: Nov. 15, 2016

(54) PROVIDING DRAWING ASSISTANCE USING FEATURE DETECTION AND SEMANTIC LABELING

(71) Applicant: Adobe Systems Incorporated, San Jose, CA (US)

(72) Inventors: Holger Winnemoeller, Seattle, WA (US); Jun Xie, Seattle, WA (US); Wilmot Wei-Mau Li, San Francisco, CA (US); Aaron Phillip Hertzmann, San Francisco, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 400 days.

(21) Appl. No.: 14/176,034

(22) Filed: Feb. 7, 2014

(65) Prior Publication Data
US 2015/0221070 A1 Aug. 6, 2015

Related U.S. Application Data

(63) Continuation-in-part of application No. 14/171,760, filed on Feb. 3, 2014.

(51) Int. Cl.
G06K 9/00 (2006.01)
G06T 11/00 (2006.01)
G06T 11/20 (2006.01)

(52) U.S. Cl.
CPC ......... *G06K 9/00281* (2013.01); *G06T 11/001* (2013.01); *G06T 11/203* (2013.01)

(58) Field of Classification Search
CPC .... G06T 11/203; G06T 11/001; G06T 11/20; G06T 11/80; G06T 5/006; G06K 9/00281; G06K 9/4604; G06K 9/52; G06K 9/6201

USPC ......................................................... 382/203
See application file for complete search history.

(56) References Cited

U.S. PATENT DOCUMENTS 7,515,752 B2 * 4/2009 Tremblay ........... G06K 9/00402
382/182
7,926,891 B2 * 4/2011 Ritter ................. A47B 88/0477
312/319.5

(Continued)

FOREIGN PATENT DOCUMENTS

WO WO2010089665 8/2010

OTHER PUBLICATIONS

Jason M. Saragih et al., Deformable Model Fitting by Regularized Landmark Mean-Shift, 91 Int'l J. Computer Vision 200-215 (Sep. 2010).

(Continued)

*Primary Examiner* — Tom Y Lu
(74) *Attorney, Agent, or Firm* — Keller Jolley Preece

(57) ABSTRACT

Methods for providing drawing assistance to a user sketching an image include geometrically correcting adjusting user strokes to improve their placement and appearance. In particular, one or more guidance maps indicate where the user "should" draw lines. As a user draws a stroke, the stroke is geometrically corrected by moving the stroke toward a portion of the guidance maps corresponding to the feature of the image the user is intending to draw based feature labels. To further improve the user drawn lines, parametric adjustments are optionally made to the geometrically-corrected stroke to emphasize "correctly" drawn lines and de-emphasize "incorrectly" drawn lines.

20 Claims, 13 Drawing Sheets

(56) References Cited

U.S. PATENT DOCUMENTS

| | | | |
|---|---|---|---|
| 8,259,101 B2* | 9/2012 | Shimada | G06F 17/5095 345/419 |
| 9,035,953 B1 | 5/2015 | Kukulski et al. | |
| 9,305,382 B2* | 4/2016 | Winnemoeller | G06F 3/01 |
| 2004/0037463 A1* | 2/2004 | Calhoun | G06K 9/222 382/186 |
| 2006/0045343 A1 | 3/2006 | Tremblay et al. | |
| 2006/0227140 A1 | 10/2006 | Ramani et al. | |
| 2008/0024500 A1* | 1/2008 | Bae | G06T 11/203 345/442 |
| 2012/0295231 A1 | 11/2012 | Zitnick, III et al. | |
| 2013/0057540 A1* | 3/2013 | Winnemoeller | G06T 15/80 345/419 |
| 2015/0221106 A1 | 8/2015 | Winnemoeller et al. | |

OTHER PUBLICATIONS

Itamar Berger et al., Style and Abstraction in Portrait Sketching, ACM Transactions on Graphics (TOG) vol. 32, Issue 4 (Jul. 2013) Proceedings of ACM SIGGRAPH 2013.

Alex Limpaecher et al., Real-time Drawing Assistance through Crowdsourcing, ACM Transactions on Graphics (TOG) vol. 32, Issue 4 (Jul. 2013) Proceedings of ACM SIGGRAPH 2013.

C. Lawrence Zitnick, Handwriting Beautification Using Token Means, ACM Transactions on Graphics (TOG) vol. 32, Issue 4 (Jul. 2013) Proceedings of ACM SIGGRAPH 2013.

Holger Winnemöller et al., XDoG: An eXtended Difference-of-Gaussians Compendium including Advanced Image, 36(6) Stylization Computers & Graphics 740-753 (Oct. 2012).

Daniel Dixon et al., iCanDraw?—Using Sketch Recognition and Corrective Feedback to Assist a User in Drawing Human Faces, CHI '10 Proceedings of the SIGCHI Conference on Human Factors in Computing Systems (Apr. 2010).

Jun Xie, Aaron Hertzmann, Wilmot Li, and Holger Winnemoller, PortraitSketch: Face Sketching Assistance for Novices, Oct. 2014, UIST 14, Proceedings of the 27th annual ACM symposium on User interface software and technology, pp. 407-417.

Arvo, J., and Novins, K. Fluid Sketches: Continuous Recognition and Morphing of Simple Hand-drawn Shapes. In Proc. UIST (2000), 73-80.

Barla, P., Thollot, J., and Sillion, F. Geometric Clustering for Line Drawing Simplification. In Proc. EGSR (2005).

Cole, F., Golovinskiy, A., Limpaecher, A., Barros, H. S., Finkelstein, A., Funkhouser, T., and Rusinkiewicz, S. Where Do People Draw Lines? ACM Trans. Graph. 27, 3 (Aug. 2008).

Comaniciu, D., and Meer, P. Mean Shift: A Robust Approach Toward Feature Space Analysis. IEEE Trans. PAMI 24, 5 (May 2002), 603-619.

Cummmings, D., Vides, F., and Hammond, T. I Don't Believe My Eyes!: Geometric Sketch Recognition for a Computer Art Tutorial. In Proc. SBIM (2012).

Eitz, M., Hays, J., and Alexa, M. How Do Humans Sketch Objects? ACM Trans. Graph. 31, 4 (Jul. 2012).

Fernquist, J., Grossman, T., and Fitzmaurice, G. Sketch-sketch Revolution: An Engaging Tutorial System for Guided Sketching and Application Learning. In Proc. UIST (2011).

Flagg, M., and Rehg, J. M. Projector-guided painting. In Proc. UIST (2006).

Iarussi, E., Bousseau, A., and Tsandilas, T. The Drawing Assistant: Automated Drawing Guidance and Feedback from Photographs. In Proc. UIST (2013).

Kazi, R. H., Igarashi, T., Zhao, S., and Davis, R. Vignette: Interactive texture design and manipulation with freeform gestures for pen-and-ink illustration. In Proc. CHI (2012).

Lee, Y. J., Zitnick, C. L., and Cohen, M. F. ShadowDraw: Real-time User Guidance for Freehand Drawing. ACM Trans. Graph. 30, 4 (Jul. 2011).

Lewis, J. R. Pairs of latin squares to counterbalance sequential effects and pairing of conditions and stimuli. In Proc. Human Factors and Ergonomics (1989).

Pusch, R., Samavati, F., Nasri, A., and Wyvill, B. Improving the sketch-based interface. The Visual Computer 23, 9-11 (2007), 955-962.

Salisbury, M. P., Anderson, S. E., Barzel, R., and Salesin, D. H. Interactive pen-and-ink illustration. In Proc. SIGGRAPH (1994).

Turk, G., and Banks, D. Image-guided Streamline Placement. In Proc. SIGGRAPH (1996), 453-460.

Zhao, M., and Zhu, S.-C. Artistic Rendering of Portraits. In Image and Video-Based Artistic Stylisation, P. Rosin and J. Collomosse, Eds. Springer, London, 2013.

U.S. Appl. No. 14/171,760, Jul. 9, 2015, Office Action.
U.S. Appl. No. 14/171,760, Nov. 23, 2015, Notice of Allowance.
U.S. Appl. No. 14/171,760, Feb. 26, 2016, Notice of Allowance.

* cited by examiner

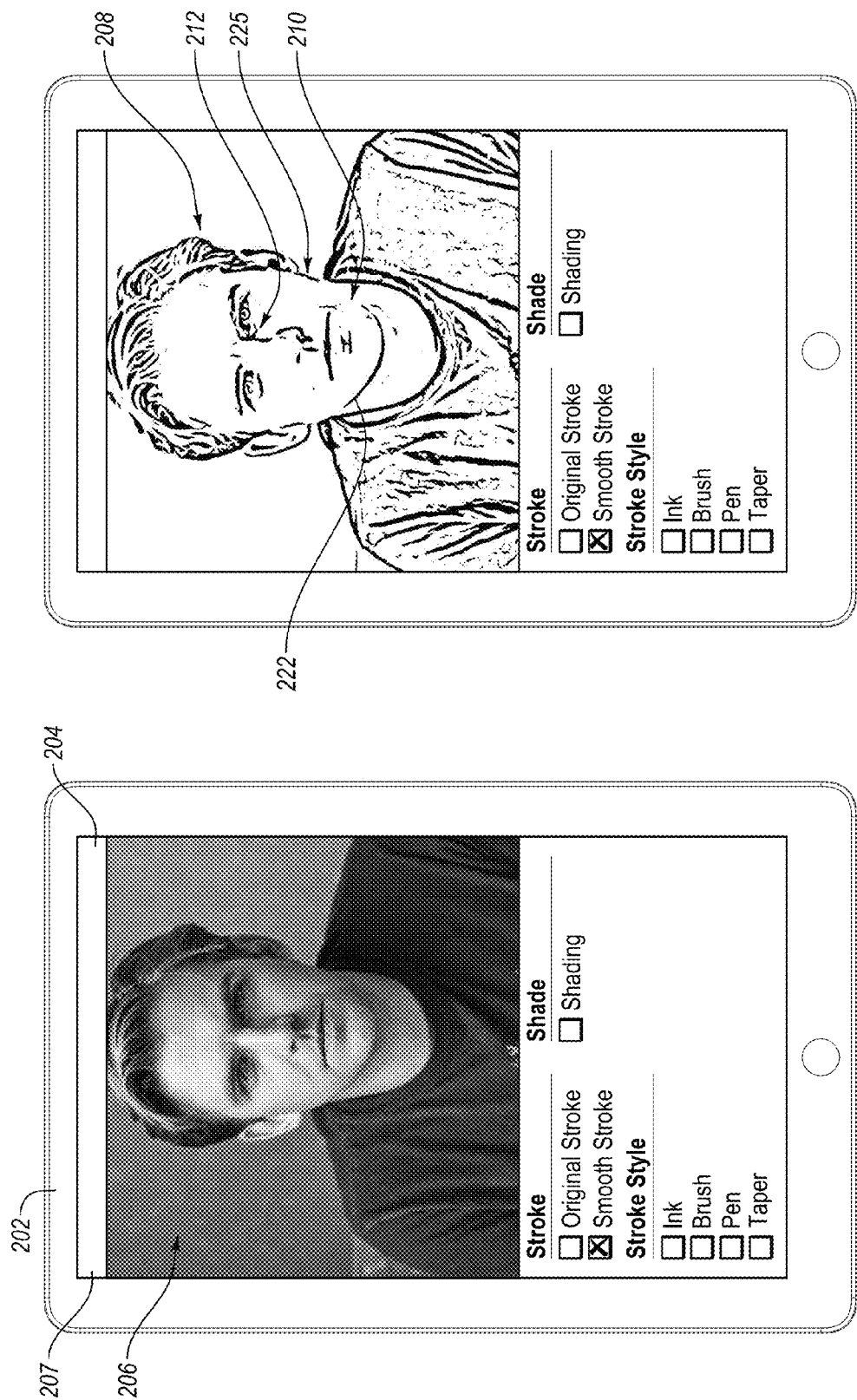

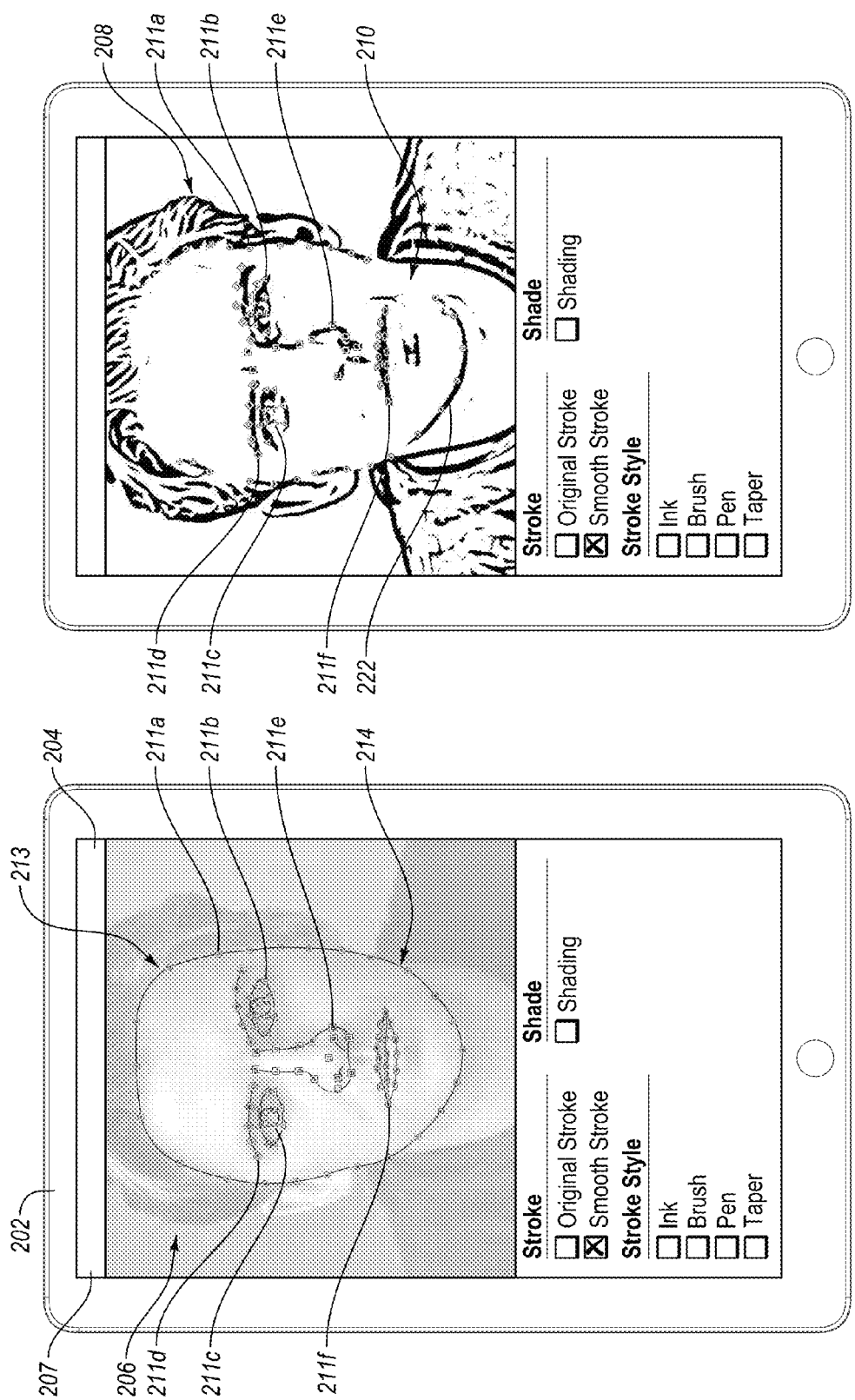

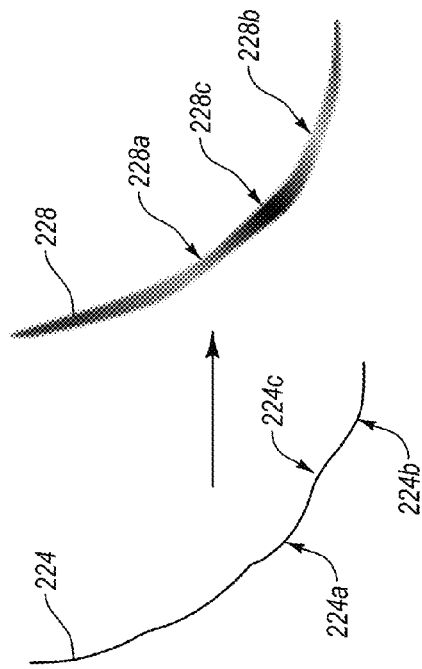
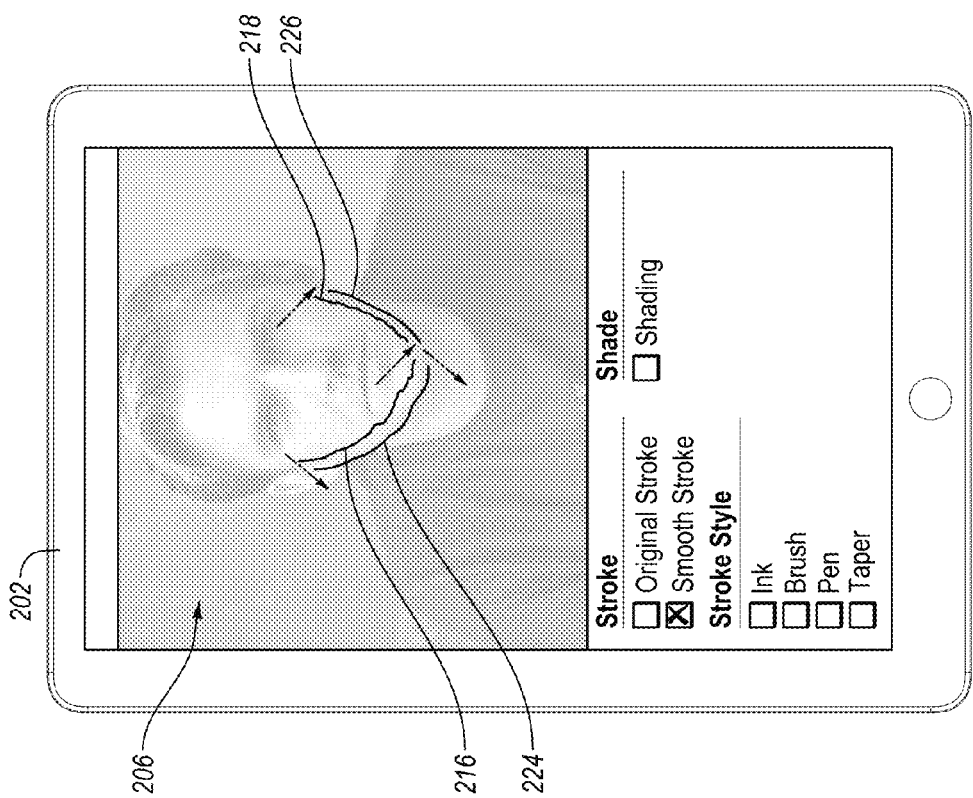
Fig. 2H
Fig. 2G

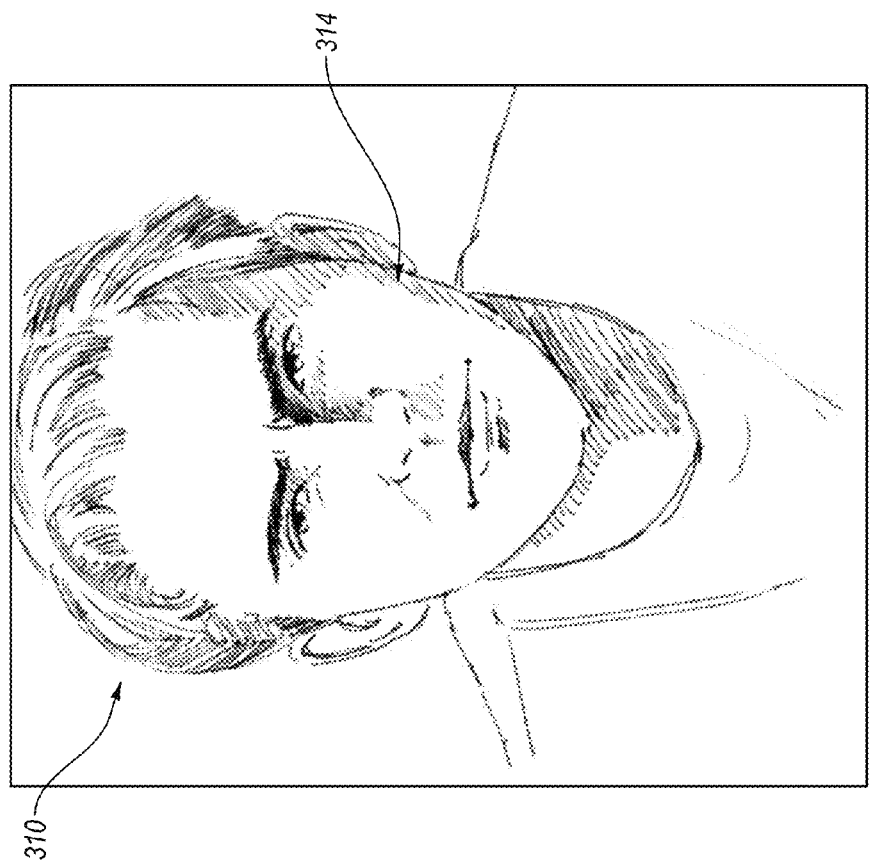
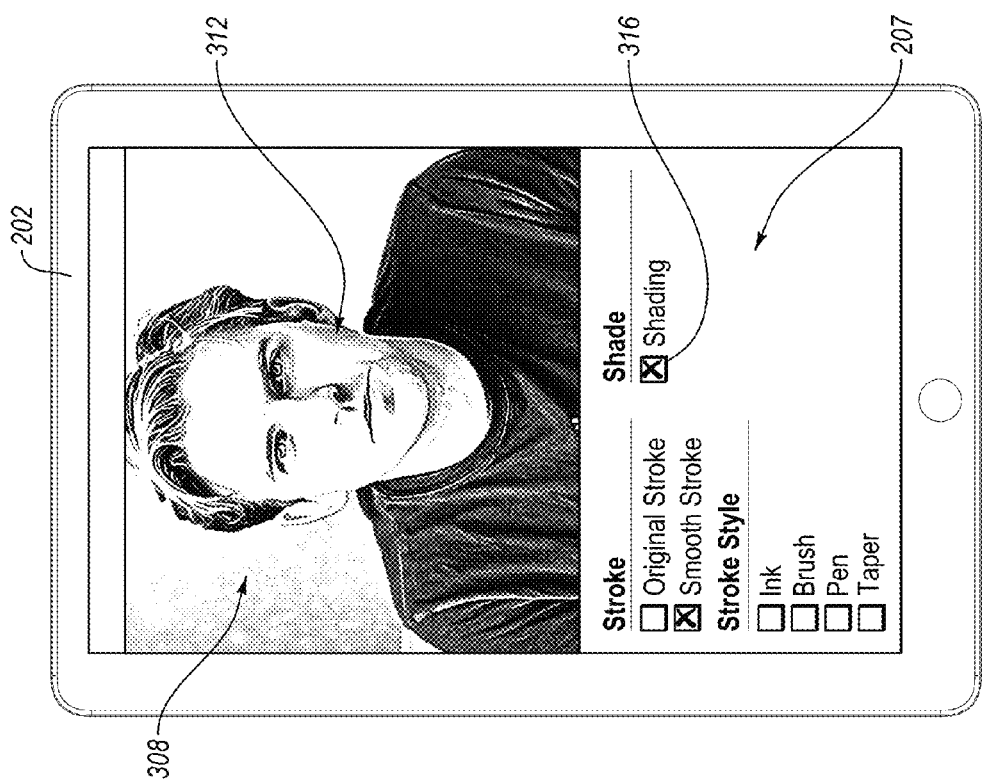
Fig. 3B
Fig. 3A

PROVIDING DRAWING ASSISTANCE USING FEATURE DETECTION AND SEMANTIC LABELING

CROSS REFERENCE TO RELATED APPLICATIONS

The present application is a continuation-in-part of U.S. patent application Ser. No. 14/171,760, filed Feb. 3, 2014 and entitled "Geometrically and Parametrically Modifying User Input to Assist Drawing," the contents of which are hereby incorporated by reference in their entirety.

BACKGROUND OF THE INVENTION

1. The Field of the Invention

One or more embodiments of the present invention relate generally to providing a user with drawing assistance. More specifically, one or more embodiments of the present invention relate to systems and methods of adjusting user strokes based on semantic labeling information to assist in drawing.

2. Background and Relevant Art

Drawing is an important form of communication and expression. Unfortunately, drawing novices are sometimes hesitant to draw because they feel they lack the creative and technical skills to produce works of satisfactory visual quality. Drawing assistance programs attempt to aid drawing novices in their attempts to create quality drawings. Conventional drawing assistance programs often provide a tutorial approach. While tutorials can help a user produce improved drawings, they often reduce or minimize a user's style. Furthermore, the tutorials, visual cues, and other interaction paradigms can make the user feel less ownership and personal satisfaction with the resultant work.

In order to provide assistance and correct a user's drawing, a guide, such as the results of an edge detection filter that provides an idea of what lines the user should and should not draw can be expedient. The results of edge detection filters, however, present various drawbacks that prevent them being effectives guide for correcting a user's drawing. For example, artists are selective with drawing lines and purposefully leave some features undrawn to create depth and perspective. In contrast, edge detection filters typically produce an abundance of edges. Thus, results of edge detection filters are often too noisy and inconsistent for use as an effective drawing assistance guide.

Along related lines, when an image has regions of high pixel density, an edge detection filter can produce areas of high edge concentration. When a user attempts to sketch a feature in such areas, it can be difficult or impossible to determine which edge should be used as a guide for the user stroke. As such, conventional drawing assistance programs can use one edge to correct a portion of a user stroke, and another edge to correct another portion of the user stroke. The result of such corrections can lead to distorted drawings.

Novices typically believe they are not creative or that they do not possess the appropriate skill level to draw. Drawing novices often share common challenges that cause them to lack confidence and produce works of lesser quality. These challenges can include, among other challenges, the lack of understanding of light, depth, perspective, and element relationships within a drawing. Due to the inability for the novice to overcome these challenges, drawings created by novices are often of poor quality, which cause the novices to shy away from using drawings as a form of communication and expression.

One challenge drawing novices face is how to draw aesthetic looking lines to produce a quality result. Novices are often uncertain about the placement, shape, and curvature of lines. This uncertainty can cause a novice to draw slowly with many corrections along a single stroke. Such strokes typically appear jagged and otherwise lack the dynamic appearance of a stroke of a skilled artist, which is performed with controlled speed and curvature.

Another challenge for drawing novices is that they commonly draw what they "know" rather than what they "see." For example, when sketching faces, drawing novices tend to draw both the eyes and the mouth as closed almond-shapes. This is in contrast to trained artists that tend to place emphasis on some lines while omitting others to convey structural details and lighting effects. The inability of drawing novices to see and convey contours and lighting effects often leads to simplified representations of objects, and produces a lower quality final result.

Drawing and sketching using computers, tablets, and mobile devices has become increasing popular. Such devices provide many advantages, including accessibility and ease of use. Unfortunately, computing devices can exacerbate the challenges that drawing novices face when drawing. For example, the use of low-fidelity input devices, such as a touch-screen or trackpad, can lead to misplaced, offset, or jittery lines. Indeed, the "fat finger" problem can make it difficult for even more experienced artists to draw in the "correct" spot.

These and other disadvantages may exist with respect to drawing, particularly using touch-screen or other low fidelity devices.

BRIEF SUMMARY OF THE INVENTION

Embodiments of the present invention provide benefits and/or solve one or more of the foregoing or other problems in the art with systems and methods that use semantic labeling to provide intelligent drawing assistance. In particular, in one or more embodiments a drawing assistance system detects the features of an image the user is drawing. As a user draws a stroke, the user stroke is geometrically corrected by moving the stroke toward the feature of the image the user is intending to draw.

In one or more embodiments, the drawing assistance systems and methods use one or more guidance maps as a basis for correcting the user strokes. The guidance map(s) can provide an indication of where and how a user should draw features of the image. In some embodiments such indication can be explicit, such as through suitable visualization of the guidance map(s) (e.g., the user can trace over a guidance map). In other embodiments, the indication can be implicit. In other words, the user does not see the guidance map(s). Instead, as the user draws, the users strokes are corrected to align with the features of the guidance map, as described below in a manner imperceptible to the user. Additionally, one or more of the guidance maps can indicate the location of features detected in the image through the use of semantic labels. The semantic labels can help ensure that a user stroke is moved toward the feature the user is intending to draw during the correction process rather than another nearby feature.

To further improve the user's strokes, optionally the drawing assistance systems and methods can optionally provide parametric adjustments. The parametric adjustments emphasize "correctly" drawn lines and de-emphasize "incorrectly" drawn lines. Additionally, parametric adjustments can convey structural details and lighting effects.

The systems and methods disclosed herein can allow users with little or no training to create visually pleasing drawings. In particular, systems and methods of one or more embodiments can help correct the geometric placement of a user's lines due to inexperience, uncertainty, and/or the use of low-fidelity input devices. In one or more embodiments, the systems and methods disclosed herein can provide such benefits while maintaining a user's individual style so as to produce drawings that help provide the user with a sense of ownership and a high degree of personal satisfaction.

Additional features and advantages of exemplary embodiments of the present invention will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter. The foregoing summary is not an extensive overview, and it is not intended to identify key elements or indicate a scope of the invention. Rather the foregoing summary identifies aspects of embodiments of the invention as a prelude to the detailed description presented below.

BRIEF DESCRIPTION OF THE DRAWINGS

In order to describe the manner in which the above recited and other advantages and features of the invention can be obtained, a more particular description of the invention briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings in which:

FIG. 2A illustrates a computing device displaying an image to be drawn over by a user in accordance with one or more embodiments of the present invention;

FIG. 2B illustrates the computing device of FIG. 2A displaying a guidance map of the image of FIG. 2A in accordance with one or more embodiments of the present invention;

FIG. 2C illustrates the computing device of FIG. 2A displaying a feature guidance map of the image of FIG. 2A with feature labels indicating the different features detected in the image in accordance with one or more embodiments of the present invention;

FIG. 2D illustrates the computing device of FIG. 2A displaying the guidance map of FIG. 2B along with feature labels indicating the different features detected in the image in accordance with one or more embodiments of the present invention;

FIG. 2G illustrates the computing device and image of FIG. 2A and two geometrically-corrected strokes in accordance with one or more embodiments of the present invention;

FIG. 2H illustrates a parametrically adjusted version of one of the geometrically-corrected strokes of FIG. 2G in accordance with one or more embodiments of the present invention;

FIG. 3A illustrates another guidance map of the image of FIG. 2A in accordance with one or more embodiments of the present invention;

FIG. 3B illustrates an artist sketch of the image of FIG. 2A in accordance with one or more embodiments of the present invention;

DETAILED DESCRIPTION

Figure 1:
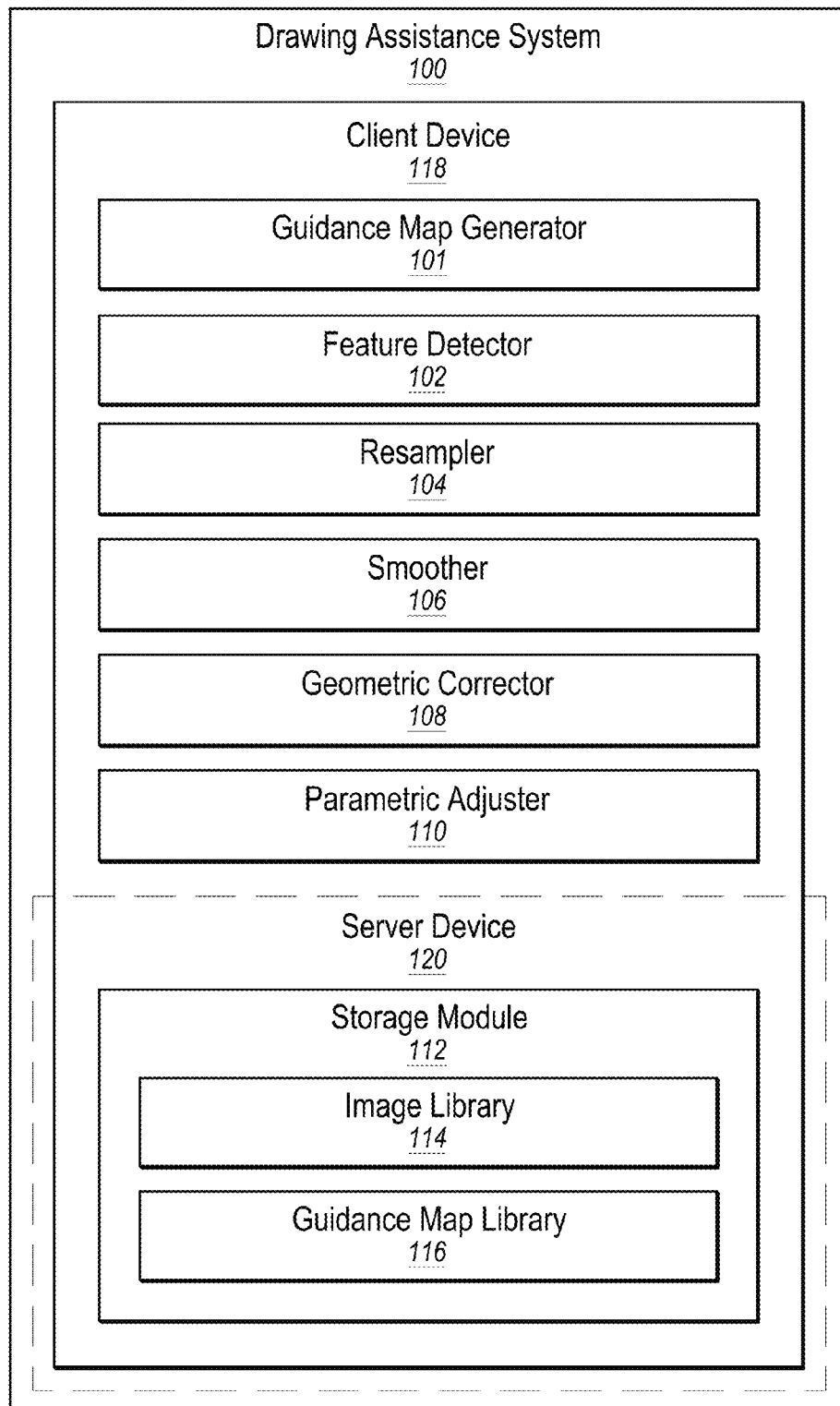
FIG. 1 illustrates a drawing assistance system in accordance with one or more embodiments of the present invention.

One or more embodiments of the present invention include a drawing assistance system that helps a user create an original drawing or sketch. In particular, the drawing assistance system provides an image on top of which a user can draw. As a user draws a stroke, the drawing assistance system geometrically corrects the stroke by moving the stroke toward the feature of the image the user is intending to draw. The drawing assistance system can use one or more guidance maps as a baseline or guide for correcting user strokes. The guidance map(s) can provide an indication of where and/or how a user should place their strokes.

To help ensure that user strokes are properly corrected (i.e., that a user stroke is moved toward a feature of the image the user is intending to draw rather than another nearby feature), at least one of the guidance maps can include semantic or feature labels indicating the location of one or more features of the image. As a user draws a stroke, the drawing assistance system can detect which feature the user is intending to draw, and then correct the stroke using the intended feature as a guide. Thus, the semantic or feature labeling can allow the systems and methods to know what geometric adjustments to make even when the user is drawing regions that are dense with features. As such, one or more embodiments can provide intelligent drawing assistance that recognizes a user's intent and corrects the user's strokes accordingly.

The systems and methods disclosed herein can allow users with little or no training to create visually pleasing drawings. As mentioned above, the systems and methods disclosed herein can make geometric corrections to a user's strokes. As used herein, the terms "geometric corrections" or "geometrically correcting" refers to moving, repositioning, and/or reshaping user drawn strokes or lines (or portions thereof) toward a "correct" position and shape as defined by one or more guidance maps. For example, geometric corrections can move, reposition, and/or reshape user drawn strokes or lines misplaced and/or misshapen due to a lack of control or uncertainty. Moreover, geometric corrections can aid skilled artists using low-fidelity input devices (such as a touch-screen, a mouse, or a trackpad) by compensating for misalignments due to the "thick finger" problem.

The systems and methods disclosed herein can provide the geometric corrections while also maintaining stylistic properties of the user's original stroke. In particular, stylistic choices or characteristics of the user's original stroke (such as stroke quality, length, shape, and curvature) can be at least partially maintained despite geometrically correcting the user's stroke. Maintaining a user's individual style can help provide the user with a sense of ownership and a connection to the output drawing, as well as a high degree of personal satisfaction for creating a higher quality output drawing.

In addition to geometrically correcting a user's strokes, another way one or more embodiments of the present invention can further help provide a visually pleasing drawing is by parametrically adjusting a user's strokes. As used herein, the terms "parametric adjustments" or "parametrically adjusting" refers to emphasizing or de-emphasizing lines based on whether they are "correctly" drawn or "incorrectly" drawn as defined by one or more guidance maps. Parametric adjustments can help reduce the negative effects of miss-drawn or miss-placed lines by lightening or otherwise de-emphasizing them. Along related lines, parametric adjustments can help emphasize correctly drawn lines by darkening them or increasing their opacity. Additionally, parametric adjustments can help convey depth, structural details, and lighting effects.

In order to help provide the user with a sense of ownership for the output drawing, in one or more embodiments, the system modifies each input stroke as the user draws the stroke. In other words, as the user draws a stroke, the system does not display the user stroke, but rather, the system displays the geometrically-corrected, and optionally parametrically-adjusted, stroke. In such embodiments the correction and adjustment process is imperceptible to the user, which can reduce the user's awareness of the amount of any geometric corrections and parametric adjustments. In alternative embodiments, the user can view the input strokes momentarily as they are drawn to get an idea of the corrections and adjustments the system performs. Additionally or alternatively, the system can provide an option to the user to view the input drawing of original strokes so as to be able to compare the input drawing to the output drawing made up of the geometrically-corrected and optionally parametrically-adjusted strokes.

Along similar lines, in embodiments where the correction process is imperceptible to the user, the guidance map(s) are not provided to the user and are used on the backend to correct the user strokes. In other words, the user may not view the guidance map(s). Alternatively, the system can provide an option to the user to view the guidance map(s) so as to be able to compare the input drawing, the output drawing, and the guidance map(s).

FIG. 1 illustrates an embodiment of an exemplary drawing assistance system 100. The drawing assistance system 100 may include, but is not limited to, a guidance map generator 101, a feature detector 102, a resampler 104, a smoother 106, a geometric corrector 108, a parametric adjustor 110, and a storage module 112. Each of the components 101-112 of the drawing assistance system can be in communication with one another using any suitable communication technologies. As shown by FIG. 1, the drawing assistance system 100 can include one or more computing devices (i.e., client device 118, server device 120).

It will be recognized that although the components 101-112 of the drawing assistance system 100 are shown to be separate in FIG. 1, any of components 101-112 may be combined into fewer components, such as into a single component, or divided into more components as may serve a particular embodiment. The components 101-112 can comprise software, hardware, or both. For example, the components 101-112 can comprise one or more instructions stored on a computer-readable storage medium and executable by processors of one or more computing devices (e.g., client device 118 and/or server device 120). When executed by the one or more processors, the computer-executable instructions of the drawing assistance system 100 can cause the computing device(s) 118, 120 to perform the drawing assistance methods described herein. Alternatively, the components 101-112 can comprise hardware, such as a special purpose processing device to perform a certain function or group of functions. Additionally or alternatively, the components 101-112 can comprise a combination of computer-executable instructions and hardware.

Furthermore, the components 101-112 of the drawing assistance system 100 may, for example, be implemented as a stand-alone application, as a module of an application, as a plug-in for applications including image processing applications, as a library function or functions that may be called by other applications such as image processing applications, and/or as a cloud-computing model. Thus, the components of the drawing assistance system 100 may be implemented as a stand-alone application, such as a desktop or mobile application. Alternatively or additionally, the components of the drawing assistance system 100 may be implemented in any image processing application, including but not limited to ADOBE PHOTOSHOP, ADOBE PHOTOSHOP ELEMENTS, and ADOBE ILLUSTRATOR. "ADOBE", "PHO- TOSHOP", "ELEMENTS", and "ILLUSTRATOR" are either registered trademarks or trademarks of Adobe Systems Incorporated in the United States and/or other countries.

Figure 2F:
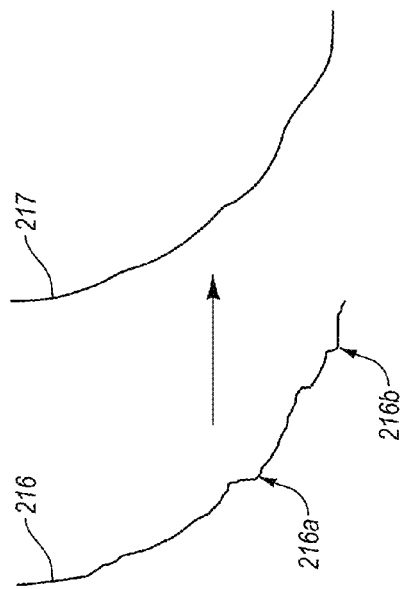
FIG. 2F illustrates one of the user strokes of FIG. 2E and a smoothed version of the user stroke in accordance with one or more embodiments of the present invention.

FIGS. 2A-2H and the related description provide an overview of a drawing assistance method that can be performed by the drawing assistance system 100. FIG. 2A illustrates a client device 202 on which a drawing assistance system 100 or one or more of the drawing assistance components 101-112 may be implemented. In other words, the client device 202 is one example of a computing device that can form part of the drawing assistance system 100. In the embodiment illustrated in FIG. 2A, the client device 202 comprises a tablet with a touch screen 204. A tablet with the touch screen 204 is only one type of client device 118 that can be used as part of the drawing assistance system 100. For example, in alternative embodiments the client device 202 can comprise any number of different types of computing devices, such as those described below in reference to FIG. 8.

To aid the user and reduce the intimidation of a blank page, the drawing assistance system 100 can provide an image 206 in a user interface 207. The drawing assistance system 100 can provide the image 206 by instructing the client device 202 to display the image 206 via a display device (e.g., touch screen 204). The image 206 can comprise an image that the user selects from the image library 114 of the storage module 112. The image library 114 can include a plurality of images that users can select to draw. Additionally or alternatively, the user can import/upload an image to the drawing assistance system 100, such as from a local drive, the Internet, or from a camera of a device upon which the drawing assistance system 100 is implemented. When a user imports or otherwise selects an image 206 not saved in the image library 114, the drawing assistance system 100 can automatically add it to the image library 114 for future use.

As shown by FIG. 1, the storage module 112, including the image library 114 and the guidance map library 116, can be located in full or in part at the client device 118. Alternatively, the storage module 112 including the image library 114 and the guidance map library 116 can be located at the server device 120. In such embodiments, the client device 118 can communicate with the server device 120 via a network to retrieve images 206 or guidance maps.

The image 206 shown in FIG. 2A is the face of an actor. Faces are often challenging to draw, yet are uniquely important in visual communication. As such, example embodiments of the present invention are described herein in reference to correcting user drawings of faces. One will appreciate in light of the disclosure herein that the present invention is not limited to correcting drawings of faces. Indeed, the drawing assistance system 100 can aid the user in drawing essentially any image with additional semantic information.

As mentioned previously, the drawing assistance system 100 can use one or more guidance maps as a guide for correcting user strokes. The drawing assistance system 100 can produce or retrieve guidance maps for the image 206. As used herein, the term "guidance map" refers to data representing and idealized version of one or more portions of the image. The guidance maps provide the baseline for geometric corrections and parametric adjustments. A guidance map can comprise a rendering of points, lines or edges representing one or more portions of the image. Alternatively a guidance map can comprise a collection of data points. Furthermore, in one or more embodiments a guidance map can include semantic labeling that provides context for the portions (i.e., points, lines, or edges) of the guidance map. In any event, during geometric correction, the drawing assistance system 100 moves (e.g., repositions and/or reshapes) the user's strokes to, or toward, the lines or edges of the guidance map(s). In other words, the guidance map(s) can indicate what lines the user "should" draw and where the user "should" draw the lines. Exemplary guidance maps include the result of an edge detection filter applied to an image, an artist sketch of the image, results of a feature detection algorithm, and a consensus of user drawings of the image 206.

The guidance map generator 101 can produce one or more guidance maps from a selected image 206. For example, FIG. 2B illustrates one embodiment of an edge guidance map 208 of the image 206 of FIG. 2A. To produce the edge guidance map 208, the guidance map generator 101 can run an edge detection filter on the image 206 of FIG. 2A. The edge guidance map 208 provides features (e.g., lines or edges) to which the user's strokes can be geometrically corrected and/or parametrically adjusted. Alternatively, the edge guidance map can comprise an artist sketch of the image, a consensus of user drawings of the image, or another guide that includes lines or edges indicating where one or more feature of the image 206 is located.

In one or more embodiments, the guidance map generator 101 can run an extended Difference-of-Gaussians (XDoG) filter with an edge setting on the image 206 to produce the edge guidance map 208. Suitable examples of XDoG filters are described in Holger Winnemöller et al., *XDoG: An eXtended Difference-of-Gaussians Compendium including Advanced Image*, 36 (6) STYLIZATION COMPUTERS & GRAPHICS 740-753 (2012), the entire contents of which are hereby incorporated by reference in their entirety. One will appreciate that other edge detection filters, such as the Canny edge detector or the Sobel detector, can also provide suitable edge guidance maps. As shown by FIG. 2B, however, the XDoG filter with an edge setting is suitable to produce an edge guidance map that approximates the lines that an artist might draw when sketching the image 206. In particular, the edge guidance map 208 does not represent all of the features of the image 206 with a line. For example, as shown by arrow 210, there is no edge for the left side of the actor's face. Similarly, there are no edges in the edge guidance map 208 for portions of the bottom part of both of the eyes of the actor.

One or more embodiments of the present invention supplement an edge guidance map 208 with additional data. In particular, the drawing assistance system 100 can supplement the edge guidance map 208 by providing edges or lines where they are missing from the edge guidance map 208. Alternatively, the drawing assistance system 100 can provide another guidance map (such as a feature guidance map) that accounts for the missing edges of the guidance map 208. Thus, the additional guidance map can provide a basis for corrections of user strokes corresponding to features missing from the edge guidance map 208.

As shown by FIG. 2B, the edge guidance map 208 includes areas of crossing, dense, or merging edges. For example, the right side of the nose, the outline of the right eye, and the iris all merge together as indicated by arrow 212. One will appreciate in light of the disclosure herein that it can be difficult to know what geometric corrections to make to user strokes in the area indicated by arrow 212 because the features are not well defined. For example, the drawing assistance system 100 can segment and label the edge guidance map 208 with semantic labeling information (i.e., the feature labels obtained from the feature detection process). For example, the drawing assistance system 100 can use a Markov Random Field, Graph Partition, or nearest neighbor searching algorithm to segment the edge guidance map as explained in greater detail below.

To provide context to the edge guidance map 208, one or more embodiments include methods of labeling the edges of the edge guidance map with feature labels. The feature labels can allow the drawing assistance system 100 to reduce or eliminate ambiguity and intelligently correct user strokes in areas where features merge or otherwise intersect.

In particular, the feature detector 102 can analyze the image 206 to identify features of the image 206. For example, the feature detector 102 can apply an image feature detection algorithm to identify various features of the image 206. FIG. 2C illustrates the result of a face tracker algorithm applied to the image 206. As shown by FIG. 2C, the various features of the image 206 have been identified and associated with feature labels 211a-211f. In particular, the feature detector 102 has associated the outline of the face with feature labels 211a, the outline of the eyes with feature labels 211b, the outline of the irises with feature labels 211c, the eyebrows with feature labels 211d, the nose with feature labels 211e, and the mouth with feature labels 211f.

Using one or more of the features identified by the feature detector 102, the guidance map generator 101 can produce or retrieve a feature guidance map 213 for the image 206. As used herein, the term "feature guidance map" refers to points and/or lines identifying features of an image detected by the feature detector 102. A feature guidance map can comprise a rendering of points, lines or edges representing one or more portions of the image. Alternatively, a feature guidance map can comprise a collection of data points. In one or more embodiments, the feature guidance map 213 excludes features of the images not identified by the feature detector 102. For example, when the feature detector 102 comprises applies a face detector algorithm, the feature guidance map 213 includes points and/or lines identifying the outline of the face, eyes, irises, eyebrows, nose, and lips, as shown by FIG. 2C. The feature guidance map 213 shown in FIG. 2C, however, does not include points and/or lines identifying the hair or shirt of the actor. Alternatively, the feature guidance map can include only feature missing from the edge guidance map. Additionally, embodiments the feature detector 102 can apply multiple detection algorithms to the image. For example, feature detector 102 can apply a texture recognition algorithm in addition to the face detection algorithm. The texture recognition algorithm can identify regions of different texture (e.g., shirt vs. skin vs. hair).

Furthermore, the feature detector 102 is not limited to detecting facial features. For example, the feature detector 102 can also, or alternatively, detect and label features of images of scenes or objects other than faces. For example, the feature detector 102 can detect scenery (mountains, trees, lakes, sky, water, streets, buildings, etc.) or components of an object (e.g., spokes, wheels, and frame of a bike or body, windows, and tires of a car). Furthermore, the feature detector 102 can also comprise a pose detector, a clothing detector, a person detector or any other available detection algorithm or component that can provide data/feature recognition for sematic labeling.

The feature guidance map 213 can provide a supplement to another guidance map in providing a baseline for geometric corrections. For example, when the edge guidance map 208 does not include edges for a feature or portions of a feature, the feature guidance map 213 can be used to supplement the edge guidance map 208. For example, FIG. 2D illustrates that the edge guidance map is missing an edge for the left side of the actor's face, as indicated by arrow 222. As explained further below, the during geometric correction, the drawing assistance system 100 can move (e.g., repositions and/or reshapes) a stroke that the user intended to be the left side of the actor's face to, or toward, the line 214 of the feature guidance map 213 (see FIG. 2C) corresponding to the left side of the actor's face.

In any event, once the feature detector 102 has identified the different features of the image 206, the guidance map generator 101 can associate feature labels 211a-211f with edges of the edge guidance map 208 corresponding to the identified features. For example, FIG. 2D illustrates feature labels 211a-211f associated with the edges of the edge guidance map 208 corresponding to the features of the image 206. Specifically, the guidance map generator 101 associates feature labels 211a with the edges of the edge guidance map 208 that form the outline of the face, associates feature labels 211b with the edges that form the outline of the eyes, associates feature labels 211c with edges that form the outline of the irises, associates feature labels 211d with the edges that form the eyebrows, associates feature labels 211e with the edges that form the nose, and associates feature labels 211f with the edges that form the mouth.

Figure 2E:
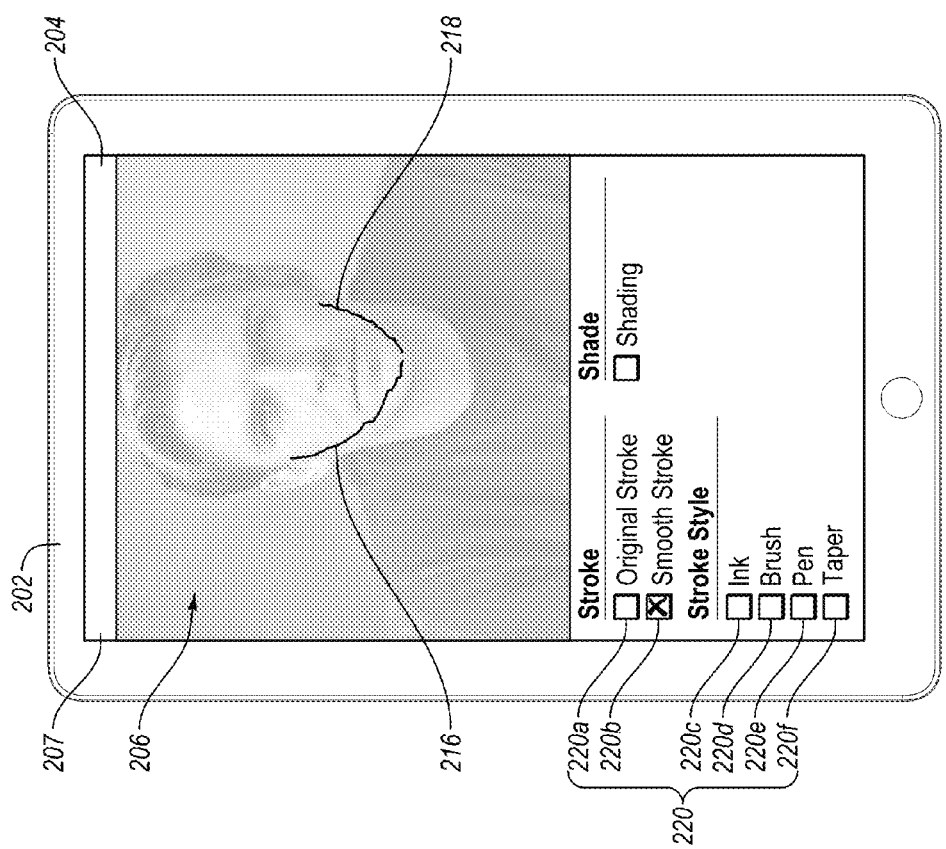
FIG. 2E illustrates the computing device of FIG. 2A displaying two user strokes drawn over the image of FIG. 2A in accordance with one or more embodiments of the present invention.

Referring now to FIG. 2E, the user can draw user stroke 216, 218 using the input device (i.e., touch screen 104). For example, the user can press a finger or a stylus against the touch screen 204 and move the finger or stylus along the touch screen 204 to draw a feature of the image 206. The drawing assistance system 100 can detect the user strokes 216, 218. As used herein the term "stroke" refers to at least a portion of a line. For example, a stroke can comprise an entire line defined by a starting point at which the user engages an input device, an ending point at which the user disengages the input device, and a path between the starting point and the ending point. Alternatively, a stroke can comprise only a portion of a line defined by a starting point at which the user engages an input device, an ending point at which the user disengages the input device, and a path between the starting point and the ending point.

FIG. 2E further illustrates that user interface 207 can include one or more controls or options 220. In one or more embodiments, the user interface 207 can include the option 220a to use the original strokes as input by the user. Additionally, the user interface 207 can include the option 220b to smooth the user strokes. When the option 220b to smooth the user strokes is selected, the resampler 104 can resample the user stroke 216 to determine points defining the stroke 216. As shown by FIG. 2F, the smoother 106 can then smooth the user stroke(s) 216 by fitting a line to the points determined during resampling to create a smoothed user stroke 217.

One or more embodiments of the present invention can provide a user with a number of drawing options, stylistic or otherwise. In particular, the drawing assistance system can provide various stroke/pen/brush styles. For example, FIG. 2E illustrates exemplary stroke options 220c-220f. The user can select the ink 220c, brush 220d, pen 220e, or the taper 220f options for the strokes the user draws over the image 206. The use of the stroke options 220 can provide another way for users to personalize their drawing. One will appreciate that the present invention is not limited to the stroke options 220c-220f shown in FIG. 2C. The drawing assistance system 100 can provide additional or alterative brush/stroke options or other image processing tools such as those provided by ADOBE PHOTOSHOP.

The drawing assistance system 100 can determine which feature of the image 206 the user is intending to draw. As shown by FIG. 2G, the user intended the stroke 216 to be the right side of the face of the actor in the image 206. The drawing assistance system 100 can associate feature labels 211a with the user stroke 216. Similarly, the drawing assistance system 100 can associate feature labels 211a with the user stroke 218.

The drawing assistance system 100 can compare the user stroke 216 to the edge guidance map 208 to determine the nearest guidance edge 222 of the edge guidance map 208 (see FIG. 2B) with the same feature label 211a as the user stroke (i.e., feature label 211a). As shown by FIG. 2G, the geometric corrector 108 can geometrically correct the user stroke 216 to create a geometrically-corrected stroke 224 by moving the user stroke 216 toward the guidance edge 222. In particular, the geometric corrector 108 can move (e.g., reposition and/or reshape) the user stroke 216 toward, or to, the position of the guidance line 222 of the edge guidance map 208 (FIG. 2B).

The drawing assistance system 100 can compare the user stroke 218 to the edge guidance map 208 to determine the portion (e.g., guidance edge) of the edge guidance map 208 (see FIG. 2B) nearest to the user stroke 218 that has feature label 211a that matches the feature label of the user stroke (i.e., feature label 211a). In this case, the nearest guidance edge to the user stroke with the same feature label 211a may be the guidance edge 222 or the guidance edge 225 (see FIG. 2B). As both guidance edges 222 and 225 are distant from the user stroke 218, the drawing assistance system 100 can use the feature guidance map 213 (FIG. 2C) to supplement the edge guidance map 208. Specifically, the drawing assistance system 100 can determine the line or point of the feature guidance map 213 nearest to the user stroke 218, which in this case would be feature line 214. As shown by FIG. 2G, the geometric corrector 108 can generate a geometrically-corrected stroke 226 by moving the user stroke 218 toward the feature line 214. In particular, the geometric corrector 108 can move (e.g., reposition and/or reshape) the user stroke 218 toward, or to, the position of the feature line 214 of the feature guidance map 213 (FIG. 2C).

As an alternative to supplementing the edge guidance map 208, the feature guidance map 213 can alone provide a guide for correcting user strokes. In particular, user strokes can be moved toward portion (i.e., lines, edges, points) of the feature guidance map 213 to correct a user strokes independent from any correction based another guidance map (such as the edge guidance map 208). Thus, one will appreciate in light of the disclosure herein that the feature guidance map can be used in isolation or in connection with other guidance maps. In particular, in one or more embodiments when attempting to correct a user stroke, the drawing assistance system 100 can look at each guidance map individually. The drawing assistance system 100 can then employ a higher level decision mechanism that decides which guidance map to use (via a voting scheme, weighting scheme, etc.). For example, when attempting to correct the user stroke 218, the drawing assistance system 100 can determine that the edge guidance map 208 does not include nearby edges to provide a guide for the user stroke 218. Similarly, the drawing assistance system 100 can determine that the feature guidance map 213 includes nearby portions to provide a guide for the user stroke 218. As such, the drawing assistance system 100 can select to use the feature guidance map 213 rather than the edge guidance map 208 when correcting the user stroke 218.

One will appreciate in light of the disclosure herein that any number, or combination, of guidance maps can provide a basis for correcting a user's strokes. Furthermore, the guidance maps of the present invention are not limited to edge guidance maps and feature guidance maps. Indeed, embodiments of the present invention can include other guides in addition to, or as alternatives to, the feature and edge guidance maps. For example, as explained in greater detail below in reference to FIG. 3A one or more embodiments can use a shading guidance map.

Further embodiments can include an importance guidance map. The importance guidance map can indicate areas of an object to be given more or less weight during the correction process. For example, in the context of a face, an importance guidance map can indicate that areas around the eyes, eyebrows, and mouth are weighted more highly than the nose and chin. Such an importance guidance map can then be aligned with an image of an actual face through the use of a feature guidance map in a manner similar to that describe above in relation to associating feature labels with the edge guidance map. In such cases, a feature guidance map can define the spatial mapping of a generic face (and its features) to a specific face, including its spatial deviations from the template.

When geometrically correcting the user strokes 216, 218 the geometric corrector 108 can retain style elements or line variations of the user stroke 216, 218. For example, as shown by FIG. 2F, the user stroke 216 includes input variations 216a and 216b. The geometrically-corrected stroke 224, as shown in FIG. 2H, can include variations 224a, 224b based on the input variations 216a and 216b. In other words, the geometrically-corrected stroke 224 does not align precisely with the guidance line 222 due to the retention of variations in the user stroke 216. The retention of the user's style can help ensure each drawing is unique because no two users will provide identical user strokes 216.

To further improve the strokes the user has drawn, optionally a parametric adjuster 110 can parametrically adjust the geometrically-corrected stroke 224 to create a parametrically-adjusted line 228, as shown by FIG. 2H. In performing parametric adjustments, the parametric adjuster 110 emphasizes lines that are deemed to have "correct" line characteristics. For example, line characteristics that are analyzed for parametric adjustment can include line location (e.g., position), orientation, shape or any other line characteristic. In addition, while performing parametric adjustments, the parametric adjuster 110 de-emphasizes lines deemed to have "in-correct" line characteristics.

More specifically, the parametric adjuster 110 compares the geometrically-corrected stroke 224 to the guidance line 222 of the edge guidance map 208. When making the comparison, the parametric adjuster 110 detects variations 224a, 224b of the geometrically-corrected stroke 224 that deviate from the guidance line 222. The parametric adjuster 110 also detects portion(s) 224c of the geometrically-corrected stroke 224 that align, or substantially align, with the guidance line 222. The parametric adjuster 110 can then emphasize the portion(s) 224c of the geometrically-corrected stroke that align well with the guidance line 222. For example, FIG. 2H shows that the portion 228c of the parametrically-adjusted line 228 that corresponds to the portion 224c of the geometrically-corrected stroke 224 is emphasized. Similarly, the parametric adjuster 110 de-emphasizes lines, or portions thereof 224a, 224b, that do not align with the guidance line 222. For instance, FIG. 2H shows that the portions 228a, 228b of the parametrically-adjusted line 228 that correspond to the portions 224a, 224b of the geometrically-corrected stroke 224 are de-emphasized.

Similarly, the parametric adjuster 110 compares the geometrically-corrected stroke 226 to the edge guidance map 208. In so doing, the parametric adjuster 110 can determine that there is no edge in the edge guidance map 208 that corresponds to (i.e., is near) the geometrically-corrected stroke 226. As such, the parametric adjuster 110 can recognize the user stroke 218 and the geometrically-corrected stroke 226 as being misplaced. Thus, the parametric adjuster 110 de-emphasizes the geometrically-corrected stroke 226.

The parametric adjuster 110 can provide emphasis using one or more of a number of techniques. To provide emphasis the parametric adjuster 110 can modify one or more visual characteristics of the geometrically-corrected strokes 224, 226. For example, the drawing assistance system 100 can modify line thickness, line opacity, line density, and/or line color. One will appreciate in light of the disclosure herein that the parametric adjustments can help account for lighting, depth, contour, and other more advanced stylistic effects.

In particular, when an advanced guidance map is used, the parametric adjustments can help incorporate the advanced stylistic elements of the guidance map into the geometrically-corrected strokes 224, 226. For example, the edge guidance map 208 shows that portions of the eyes and chin are not completely outlined to provide an artistic effect. As edge guidance map 208 indicates, even if a user's strokes are aligned with image features, it doesn't mean that the line should have been drawn. Therefore, when a user draws a stroke not included in the edge guidance map 208, the drawing assistance system may recognize the stroke as being misplaced or otherwise drawn incorrectly. As such, when making parametric adjustments, the parametric adjuster 110 may de-emphasize any lines not included in the edge guidance map 208 (such as stroke 218). In this manner the drawing assistance system 100 can produce drawings with lighting, depth, contour, and other advanced effects commonly not drawn by novices. Additionally, the drawing assistance system 100 can help minimize the effects of a user drawing what they "know," as opposed to what is "depicted" in the reference image 206.

The geometric corrections and parametric adjustments described above in relation to user strokes 216, 218 can be repeated for each stroke the user draws. Furthermore, each of the corrections/adjustments to the user strokes 216, 218 can take place in substantially real-time. In other words, the drawing assistance system may correct and/or adjust the user's strokes 216, 218 as they are drawn/rendered on the client device 202. As previously mentioned, having the correction methods and process be imperceptible to the user can reduce the user's awareness of the corrections and elicit a feeling that the user drew the output image.

In addition to correcting or adjusting lines that delineate contours, one or more embodiments can also modify or correct shading or fill lines. In particular, the drawing assistance system can provide a shading guidance map as a baseline for correcting shading lines. One example of a suitable shading guidance map 308 is shown in FIG. 3A. The shading guidance map 308 of FIG. 3A is the result of applying an XDoG filter with brightness response settings to the image 206 of FIG. 2A. As shown, the shading guidance map 308 can provide an indication of the position and configuration of acceptable shading. In particular, FIG. 3B illustrates an artist sketch 310 of the image 206 of FIG. 2A. As shown by comparing the artist sketch 310 and the shading guidance map 308, the shading guidance map 308 can include shaded areas 312 similar to the shaded areas 314 of the artist sketch 310.

Similar to the geometric corrections described above, the shading strokes drawn by a user can be moved (e.g., repositioned and reshaped) based on the shading guidance map 308. One will appreciate in light of the disclosure herein that the exact placement of shading lines is less important compared with contour lines. The aggregate darkness (as a combination of line density and thickness) can be controlled to ensure proper shading. In one example, the drawing assistance system 100 uses the XDoG edge response guidance map 308 to constrain shading strokes within reasonable boundaries, while the drawing assistance system 100 uses the shading guidance map 308 to locally move strokes and modify the thickness and/or opacity to achieve a desired tonal density.

In order to distinguish between contour lines and shading or fill lines, the user interface 207 can include a shading option 316 as shown by FIG. 3A. When the shading option 316 is un-selected, a user's stroke(s) is treated as a contour line and is corrected as described above. When the shading option 316 is selected, the user's stroke(s) is treated as shading or fill and is corrected using modified guidance data and adjustment method and processes.

Figure 4C:
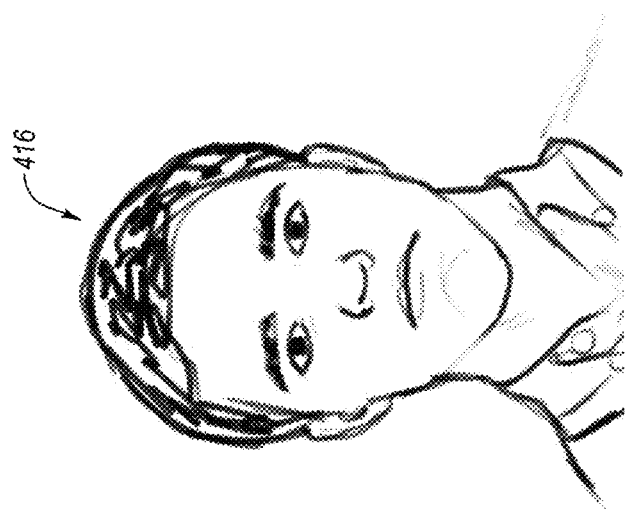
FIG. 4C illustrates an output drawing formed by geometrically correcting and parametrically adjusting the user drawn sketch of FIG. 4A in accordance with one or more embodiments of the present invention.
Figure 4B:
FIG. 4B illustrates a user drawn sketch of the image of FIG. 4A in accordance with one or more embodiments of the present invention.
Figure 4A:
FIG. 4A illustrates another image to be drawn over by a user in accordance with one or more embodiments of the present invention.

One will appreciate in light of the disclosure herein, that the drawing assistance system can beautify, correct, align, and displace user strokes to more accurately represent a source image. The amount and extent of the corrections the drawing assistance system performs can depend upon the accuracy of the user strokes. FIGS. 4A-4C illustrate the effectiveness of the drawing assistance systems and methods described herein. In particular, FIG. 4A illustrates a source image 406. FIG. 4B illustrates an input drawing 410 of user strokes drawn by a user over the image 406. FIG. 4C illustrates an output drawing 416 created by geometrically correcting and parametrically adjusting the user strokes of the input drawing 410. As shown by a comparison of the input drawing 410 and the output drawing 416, the geometrically corrected and parametrically adjusted output drawing 416 can provide a significant improvement over the input drawing 410.

Additionally, when geometrically correcting and parametrically adjusting the user's stroke, the drawing assistance system 100 can maintain stylistic properties of the user's original stroke. In particular, stylistic choices or characteristics of the user's original stroke (such as stroke quality, length, shape, and curvature) can be at least partially maintained despite geometrically correcting and parametrically adjusting the user's stroke. Maintaining a user's individual style can leave the user with a sense of ownership and a high degree of personal satisfaction for the output drawing.

Figure 5C:
FIG. 5C illustrates yet another output drawing formed by geometrically and parametrically adjusting the user strokes in accordance with one or more embodiments of the present invention.
Figure 5B:
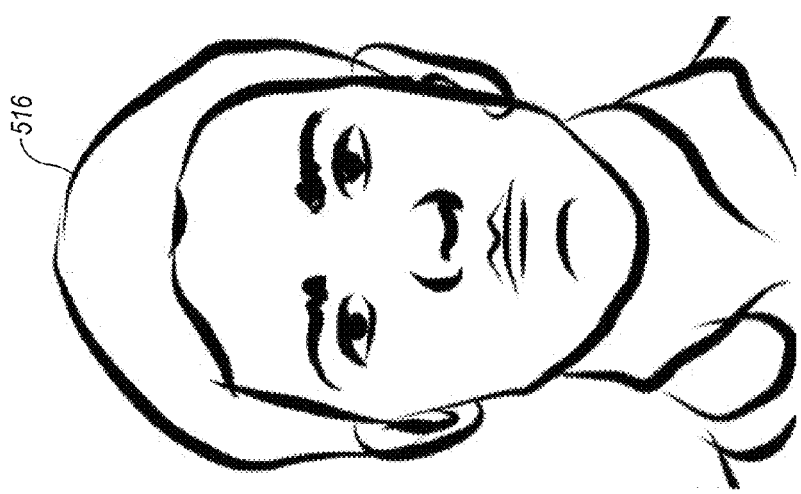
FIG. 5B illustrates another output drawing formed by geometrically correcting and parametrically adjusting the user strokes in accordance with one or more embodiments of the present invention.
Figure 5A:
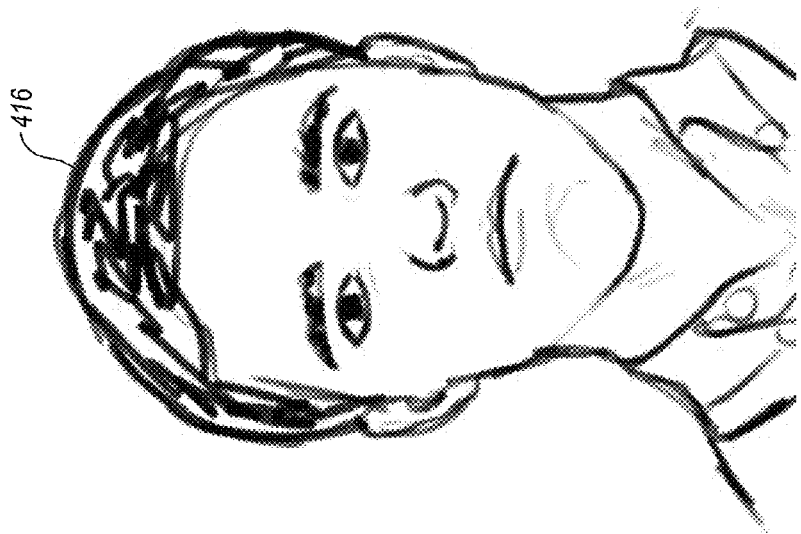
FIG. 5A illustrates the output drawing of FIG. 4C.

One will appreciate in light of the disclosure herein that the stroke options 220 (FIG. 2E), in combination with maintaining the style of a user's stroke, can help ensure that each drawing, even if based on the same image, differs in one or more aspects. For example, FIGS. 5A-5C illustrate three output drawings (i.e., geometrically-corrected and parametrically-adjusted drawings) 416, 516, 518 of the image 406. As shown by FIGS. 5A-5C, each output drawing 416, 516, 518 provides an aesthetically pleasing drawing, while preserving distinctive style elements.

FIGS. 1-5C provide some detail regarding the geometric correction and parametric adjustment processes of one or more embodiment of the present invention. Additional or alternative details will now be provided for various sub-processes.

Stroke Resampling

As a user draws a stroke, the drawing assistance system 100 can resample the stroke. Resampling the stroke can break the stroke down into points that provide the framework of the stroke. The resampled stroke points are then used as control points. The drawing assistance system 100 can then use the control points to smooth or geometrically correct the stroke.

In one or more embodiments the drawing assistance system 100 resamples user strokes based on curvature and distance. A curvature-based approach can increase the sampling density in segments of high curvature and reduce the sampling density in segments of low curvature. For example, a circle may have many samples (e.g., 24), while a straight line may be represented by two samples.

In particular, for each incoming stroke point $x_i$ at scale s, $m_1, m_2, m_3$ are new resampled stroke points before $x_i$. If a metric $z_i$ (defined below) is greater than 1, $x_i$ is taken as a new sample point: $x_i \leftarrow m_{k+1}$. If the metric $z_i$ is less than 1, $x_i$ is skipped and $x_{i+1}$ is examined. The metric $z_i$ is defined as follows:

$$z_i = \frac{t_i \beta_i \Delta_{\theta i}}{2\pi}$$

where $\beta = \max(0, \min(1, r - t_2\sqrt{s}))$; r is the distance between $x_i$ and $m_k$; and $\Delta_{\theta i}$ is the absolute difference of orientations between $\theta \langle x_i, m_k \rangle$ and $\theta \langle m_{k-1}, m_k \rangle$. Thresholds $t_1$ and $t_2$ control the sampling densities for curve and distance, respectively.

In alternative embodiments other resampling techniques may be used. For example, other suitable resampling techniques include, but are not limited to, uniform distance sampling or temporal sampling.

Stroke Smoothing

As alluded to earlier, the user can select the option to smooth the user strokes. In alternative embodiments all user strokes can be automatically smoothed. In any event, smoothing the user strokes can reduce or eliminate jagged and uncertain user strokes. Thus, smoothing the user strokes can improve the overall quality of the user strokes, as well as the overall quality of the output drawing.

To smooth the user strokes, a curve approximation can be fit to the control points determined during the stroke resampling process. Alternatively, a curve approximation can be fit to the geometrically-corrected points. Smoothing the points can capture the shape of the stroke, while reducing jittery portions as shown by FIG. 2D. In one or more embodiments a spline function is applied to the points to smooth the user stroke. For example, each stroke can be interpolated by fitting the points with a cubic B-spline curve approximation. In alternative embodiments other smoothing techniques can be used. For example, other suitable smoothing techniques include, but are not limited to, sliding-average smoothing or Laplace smoothing.

Feature Detection

One will appreciate in light of the disclosure herein that the feature detection process can depend upon the image selected by the user to draw. For example, when the user selects an image of a face to sketch, a face detection algorithm can serve to provide feature detection. A suitable face detection algorithm is described in Jason M. Saragih, *Deformable Model Fitting by Regularized Landmark Mean-Shift*, 91 INT'L J. COMPUTER VISION 200-215 (2010), the entire contents of which are hereby incorporated by reference in their entirety. When the image comprises something other than a face, other feature detection algorithms can server to provide feature detection. Typically, a feature detection algorithm can extract standard landmarks in a preset order with respect to different regions of the image. Additionally or alternatively, a user can define features of the image manually.

Figure 6B:
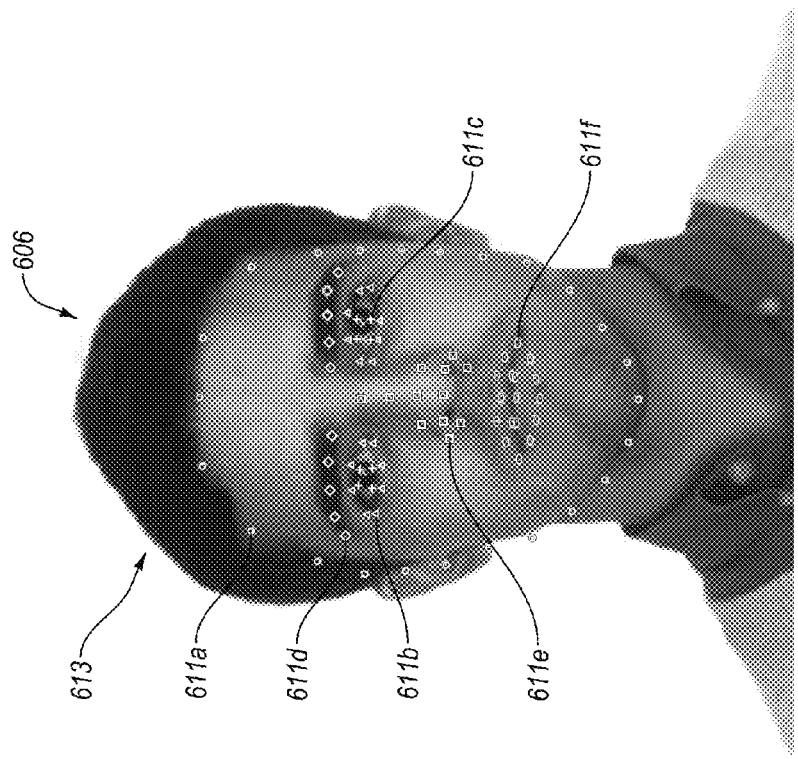
FIG. 6B illustrates the image of FIG. 6A with feature labels indicating the different features detected in the image in accordance with one or more embodiments of the present invention.
Figure 6A:
FIG. 6A illustrates the image of FIG. 4A.

FIG. 6A illustrates another image 606 of a face. FIG. 6B illustrates feature labels 611*a*-611*f* determined by applying a face detection algorithm to the image 606. In particular, FIG. 6B illustrates that feature labels 611*a* are associated with the outline of the face, feature labels 611*b* are associated with the outline of the eyes, feature labels 611*c* are associated with the outline of the irises, feature labels 611*d* are associated with the eyebrows, feature labels 611*e* are associated with the nose, and feature labels 611*f* are associated with the mouth. One will appreciate that the feature detection and feature labels are not limited to those illustrated in FIG. 6B or the other figures. For example, the features on the left side of the face can have different feature labels than the features on the right side of the face. Furthermore, additional features, such as the ears or hair can include feature labels.

Guidance Maps

As mentioned above, the drawing assistance system 100 can use one or more guidance map as a baseline of what lines the user "should" be drawing and where the lines "should" be placed. The drawing assistance system 100 can retrieve a previously generated guidance map for an image the user wishes to sketch, or alternatively, the drawing assistance system 100 can generate a guidance map. Exemplary guidance maps include the result of an edge detection filter applied to the image (see 208 of FIG. 2B).

In one or more embodiments the guidance map comprises the result of an XDoG filter being applied to an image. FIG. 6C illustrates another edge guidance map 608 created using an XDoG filter with an edge setting. As shown, the edge guidance map 608 does not include an abundance of edges. Rather the edge guidance map 608 includes edges corresponding to selective features that an artist may sketch.

Figure 6D:
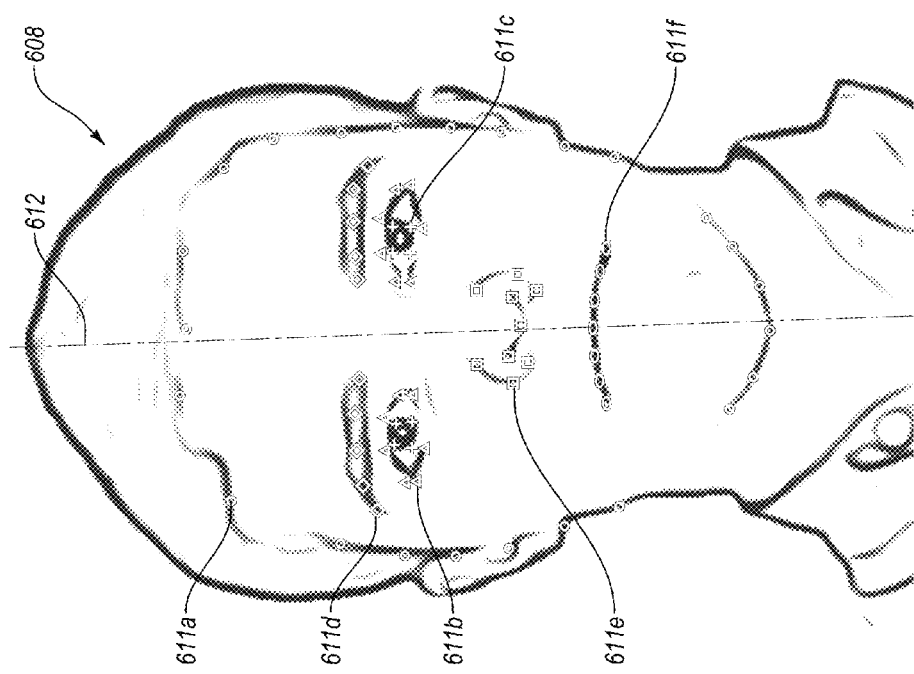
FIG. 6D illustrates the guidance map of FIG. 6C with feature labels indicating the different features detected in the image in accordance with one or more embodiments of the present invention.
Figure 6C:
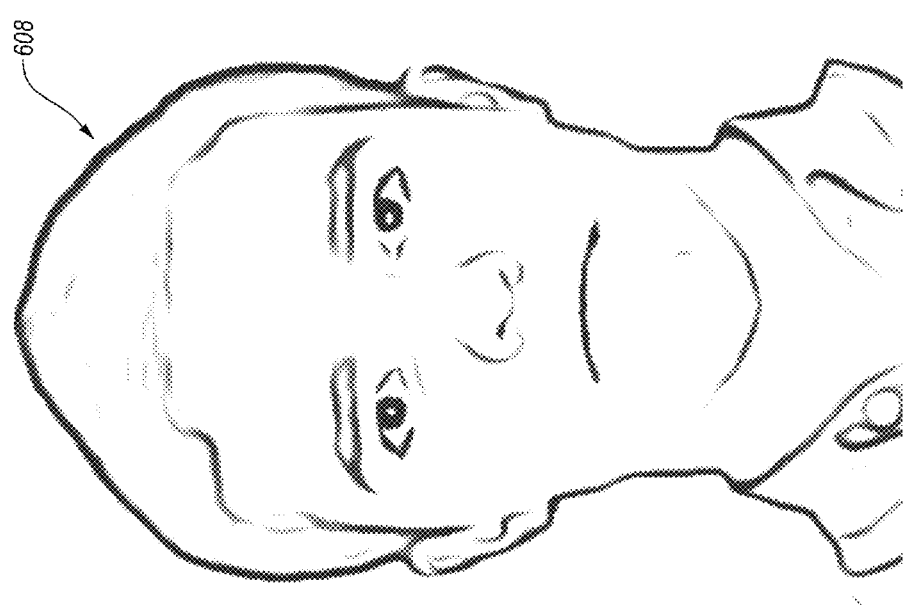
FIG. 6C illustrates a guidance map of the image of FIG. 4A in accordance with one or more embodiments of the present invention.

Referring to FIG. 6D, the drawing assistance system 100 can segment and label the edge guidance map 608 with semantic labeling information (i.e., the feature labels 611*a*-611*f* obtained from the feature detection process). For example, the drawing assistance system 100 can use a Markov Random Field, Graph Partition, or nearest neighbor searching algorithm to segment the edge guidance map 608.

For example, in one embodiment once the edges of the edge guidance map 608 are segmented, the drawing assistance system 100 perform a nearest neighbor search to identify the nearest feature point for each guidance point of a guidance edge. The drawing assistance system 100 can then determine which feature label (based on the nearest feature points) was identified for a majority of the guidance points of the guidance edge. The drawing assistance system 100 then associates the feature label identified for a majority of the guidance points for each guidance point on the guidance edge or for the guidance edge as a whole. As mentioned above, the drawing assistance system 100 can use a feature guidance map edge guidance map 608 as a baseline of what lines the user "should" be drawing and where the lines "should" be placed. The drawing assistance system 100 can use the feature guidance map alone or in connection with another guidance map (such as an edge guidance map). The drawing assistance system 100 can generate the feature guidance map using a variety of approaches or combinations thereof. For example, because human faces have a strong vertical symmetry, drawing assistance system 100 can use a feature guidance map to look up matching edges or features on either side of the face/maps, to increase the chances of finding useful data to user for corrections. In particular, once the drawing assistance system 100 has segmented and labeled the edge guidance map 608, the drawing assistance system 100 can define a vertical symmetry axis 612 as shown by FIG. 6D. If one side of the edge guidance map 608 is missing edge information, the drawing assistance system 100 can look for the missing information on the other side of the vertical symmetry axis 612. In other words, the drawing assistance system 100 can mirror the guidance edges/points on each side of the vertical symmetry axis. For example, as shown by arrow 210 of FIG. 2D, the edge guidance map 208 is missing an edge for the left side of the user's chin. To supplement the edge guidance map 208, the drawing assistance system 100 can mirror the feature points 211a on the right side of a vertical axis to provide points to which a user's stroke 218, which was intended as the left chin, can be corrected.

Additionally or alternatively, as shown by FIG. 6B, the feature points themselves can define the feature guidance map 613. For example, the drawing assistance system 100 can use the feature points or can fit a curve to the feature points and resample the line to identify feature points.

Geometric Correction

As a user draws a stroke, the drawing assistance system 100 can determine which feature of the image the user is intending to draw. For example, the drawing assistance system 100 can compare the user stroke to the guidance map to determine the line/edge of the guidance map nearest to the user stroke in position and orientation, which also has the same feature label. Upon detecting the guidance line that the user is intending to draw, the drawing assistance system can geometrically correct the user stroke by moving (e.g., repositioning and/or reshaping) the user stroke toward, or to, the line of the guidance map that the user is intending to draw.

In order to determine the feature label of the user stroke, the drawing assistance system 100 can perform a nearest neighbor search to identify the nearest feature point for each input point of the user stroke. The drawing assistance system 100 can then determine which feature label (based on the nearest feature points) was identified for a majority of the input points of the user stroke. The drawing assistance system 100 then associates the feature label identified for a majority of the input points for each input point of the user stroke, or for the user stroke as a whole.

In particular, geometric correction is modeled as an energy minimizing process for each user input with the energy function defined, at least in part, as:

$$E = \alpha E_{guidance} + \beta E_{face} + \gamma E_{variation}$$

The edge guidance map, the feature guidance map, and the variations of the user's strokes from the edge guidance map, can form the basis of the energy function. In other words, the energy function can help ensure that the user's strokes are aligned according to the edge guidance map while preserving variations/styles of the original user stroke. Given the sequential input points $x_1, x_2, \ldots x_n$ in each user stroke, the feature points $f_1, f_2, \ldots f_n$ and the guidance points $g_1, g_2, \ldots g_n$ the energy function allows geometrically-corrected points $p_1, p_2, \ldots p_n$ to be determined.

The $E_{guidance}$ term helps align the user's stroke with the edge guidance map and is defined as:

$$\sum_{i=1}^{n} \frac{1}{d_i} |p_i - g_{x_i}^*|^2$$

where $g_{x_i}^*$ is $x_i$'s closet point in the edge guidance map with the same feature label. $g_{x_i}^*$ can be determined using a nearest neighbor search. Each point can be defined using (X, Y, Curvature). Thus, when finding the nearest guidance point $g_{x_i}^*$, the difference in position and the curvature can be compared. Thus, if two guidance points are equally spaced from an input point, the guidance point with a curvature closest to that of the input point can be selected (so long as they both have the same feature label as the input stroke). The curvature of a point can be defined as $$\frac{d\phi}{ds}$$

where $\phi$ is the angle of inclination of the tangent of the line at the point. A Kd-tree implementation can also be used to speed up the nearest neighbor search process to achieve real-time, or substantially real time, corrections.

As shown by the formula for $E_{guidance}$, $E_{guidance}$ can reduce a difference in distance and curvature between the geometrically-corrected points and the identified guidance points. $d_i = |x_i - g_{x_i}^*|$, the Euclidean distance between $x_i$ and $g_{x_i}^*$. In other words, $d_i$ makes $E_{guidance}$ inversely proportional to the distance between the user's stroke (or points defining the stroke) and the nearest line/edge (or points defining the line/edge) of the guidance filter. $d_i$ reduces geometric corrections of user strokes, or portions thereof, that do not have a close corresponding line/edge in the edge guidance map. For example, referring to the image 206 of FIG. 2A and the edge guidance map 208 of FIG. 2B, if a user draws a user stroke for the actor's left chin, there is no corresponding line in the edge guidance map 208. $d_i$ can help ensure that the user stroke corresponding to the actor's left chin is not greatly corrected toward the identified guidance points. Furthermore, as explained in greater detail below, user strokes with no corresponding lines in the guidance map can be geometrically corrected based on the feature guidance map and de-emphasized during parametric adjustments.

The $E_{face}$ term helps align the user's stroke with the feature guidance map and is defined as:

$$\sum_{i=1}^{n} \frac{1}{d_{f_i}} |p_i - f_{x_i}^*|^2$$

where $f_{x_i}^*$, is $x_i$'s closet point in the feature guidance map with the same feature label. Similar to the $g_{x_i}^*$, $f_{x_i}^*$ can be determined using a nearest neighbor search. Each point can be defined using (X, Y, Curvature). Thus, when finding the nearest feature point, the difference in position and the curvature can be compared. Thus, if two feature points are equally spaced from an input point, the feature point with a curvature closest to that of the input point can be selected, so long as it has the same feature label as the input point. A Kd-tree implementation can also be used to speed up the nearest neighbor search process to achieve real-time, or substantially real time, corrections.

$d_{f_i} = |x_i - f_{x_i}^*|$ is the Euclidean distance between $x_i$ and $f_{x_i}^*$. In other words, $d_{f_i}$ makes $E_{face}$ inversely proportional to the distance between the user's stroke (or points defining the stroke) and the nearest line/edge (or points defining the line/edge) of the guidance filter. $d_{f_i}$ increases geometric corrections of user strokes, or portions thereof, that do have a close corresponding line/edge in the feature guidance map. For example, referring to the image 206 of FIG. 2A and the edge guidance map 208 of FIG. 2B, if a user draws a user stroke for the actor's left chin, there is no corresponding line in the edge guidance map 208. As explained above, $d_i$ can help ensure that the user stroke corresponding to the actor's left chin is not greatly corrected toward the identified guidance points. On the other hand, $d_{f_i}$ can help ensure that the user stroke is geometrically corrected toward the feature points with feature labels 211a as indicated by arrow 214 of FIG. 2C.

The $E_{guidance}$ and $E_{face}$ terms move the input stroke (i.e., each point of the user stroke) to, or at the very least toward, the position of the line of the edge or feature guidance map with the same feature label where the user "should have" drawn the stroke. The third term $E_{variation}$ serves to counterbalance the $E_{guidance}$ and $E_{face}$ terms to help ensure that each output drawing of the same image is not exactly the same as the guidance map by preserving the style of the user's original strokes. $E_{variation}$ is defined as:

$$\sum_{i=2}^{n} |(p_i - p_{i-1}) - (x_i - x_{i-1})|^2$$

The $E_{variation}$ term can minimize the difference of neighboring points before and after correction. In other words, the $E_{variation}$ term can help maintain the shape of the original user stroke by ensuring that neighboring points move in sync. In particular, each user stroke is broken into a plurality of points. The style of the original user stroke dictates the distances between the points making up the stroke, and thus, the shape of the stroke. The $E_{variation}$ term helps keep the distances between neighboring points in the geometrically-corrected stroke the same or similar to the distances between the corresponding neighboring points in the original user stroke.

The weights α, β, and γ can control the tradeoff between aligning the user's strokes with the edge guidance map, the feature guidance map, and maintaining the characteristics/shape of the original user stroke. In particular, as α and β are increased and γ is decreased, the geometric correction process will retain less of the characteristics of the user's original strokes and align the user's strokes more closely with the guidance map. On the other hand, as α and β are decreased and γ is increased, the geometric correction process can retain more of the characteristics of the user's original strokes and align the user's strokes less closely with the edge guidance map. In one or more embodiments the weights α, β, and γ are automatically selected to optimize the look and feel of the output drawings. In alternative embodiments the user can modify α, β, and γ to adjust how their drawings are corrected.

Parametric Adjustment

One will appreciate that due to $E_{variation}$ and users drawing what they "know," each geometrically-corrected stroke can still be offset or otherwise displaced from the edge guidance map. As part of the parametric adjustment process, the drawing assistance system can determine which geometrically-corrected strokes have been drawn "correctly" and which lines have drawn "incorrectly." In particular, the drawing assistance system can compare the geometrically-corrected strokes to the edge guidance map to determine how much they deviate from the edge guidance map. Then based on the amount of deviation or alignment with the edge guidance map, the drawing assistance system can emphasize lines in alignment with the edge guidance map and de-emphasize the lines that deviate from the edge guidance map.

The deviation or error for each point $p_i$ in a geometrically-corrected stroke can defined as the distance between $p_i$ and its closest point in the edge guidance map. More particularly, the deviation or error can be defined as:

$$e = dist(p_i, g_i^*) = \sqrt{\begin{array}{c}(X_{p_i} - X_{g^*_{p_i}})^2 + (Y_{p_i} - X_{g^*_{p_i}})^2 + \\ \eta(\text{Curvature}_{p_i} - \text{Curvature}_{g^*_{p_i}})^2\end{array}}$$

The first two terms (i.e., $(X_{p_i}-X_{g^*_{p_i}})^2+(Y_{p_i}-X_{g^*_{p_i}})^2$) represent the distance between the $p_i$ and its closest point in the edge guidance map. The third term (i.e., $\eta(\text{Curvature}_{p_i}-\text{Curvature}_{g^*_{p_i}})^2$) measures the difference of curvature between the two points. Thus, the third term ensures that a geometrically-corrected stroke that is near an edge of the edge guidance map, but curves differently from the edge of the edge guidance map is not overly emphasized.

The parametric adjustments can provide emphasis using one or more of a number of techniques. For example, the drawing assistance system can modify the line thickness. Thick lines appear more strongly in the image, so when making parametric adjustments the drawing assistance system can increase the width of well-placed lines and decrease the width of misplaced lines. Additionally or alternatively, the parametric adjustments can adjust the opacity of lines. For example, the drawing assistance system can ensure that well-placed lines are drawn opaque, while misplaced lines are drawn more transparent. When adjusting the opacity is not possible, the drawing assistance system can emulate opacity variation by simulating a brushing medium. For example, the drawing assistance system can break up strokes into individual lines (suggestive of light contact of a bristle brush with paper) and thereby reduce the perceived opacity of the overall stroke. In still further embodiments, the drawing assistance system can apply emphasis or de-emphasis using color. For example, the drawing assistance system can render the misplaced lines in a one color (e.g., light-gray) and render well-placed lines in another color or shade (e.g., dark grey).

Emphasis or de-emphasis can be applied based on the error value e for the geometrically-corrected stroke. For example, if the error of a line is below a predetermined amount or threshold, the parametric adjustments can emphasize the line. In particular, as the error value decreases, the emphasis can increase. On the other hand, if the error value is above the predetermined threshold, the parametric adjustments can de-emphasize the line. Indeed, as the error value increases, the de-emphasis can increase. If the error value is at or near the predetermined amount, the parametric adjustments can apply minimal emphasis or apply neither emphasis nor de-emphasis.

The drawing assistance system can apply the parametric adjustments globally (i.e., along the entire stroke) or locally (i.e., variations along a single stroke). For example, the parametrically-adjusted line 228 of FIG. 2H illustrates locally applied emphasis and de-emphasis. In one or more instances the locally assigned error value may not generate good visualization effects when the local errors change frequently along the same stroke. In such instances, the local errors can be smoothed along the same stroke by optimizing with a neighboring consistency penalty. A global error can be computed as an average of the local smoothed errors and then used to apply the emphasis or de-emphasis.

FIGS. 1-6D, the corresponding text, and the examples, provide a number of different systems and devices for providing drawing assistance through geometric adjustments based on semantic labeling. In addition to the foregoing, embodiments of the present invention also can be described in terms of flowcharts comprising acts and steps in a method for accomplishing a particular result. For example, FIGS. 7 and 8 illustrate flowcharts of exemplary methods in accordance with one or more embodiments of the present invention.

Figure 7:
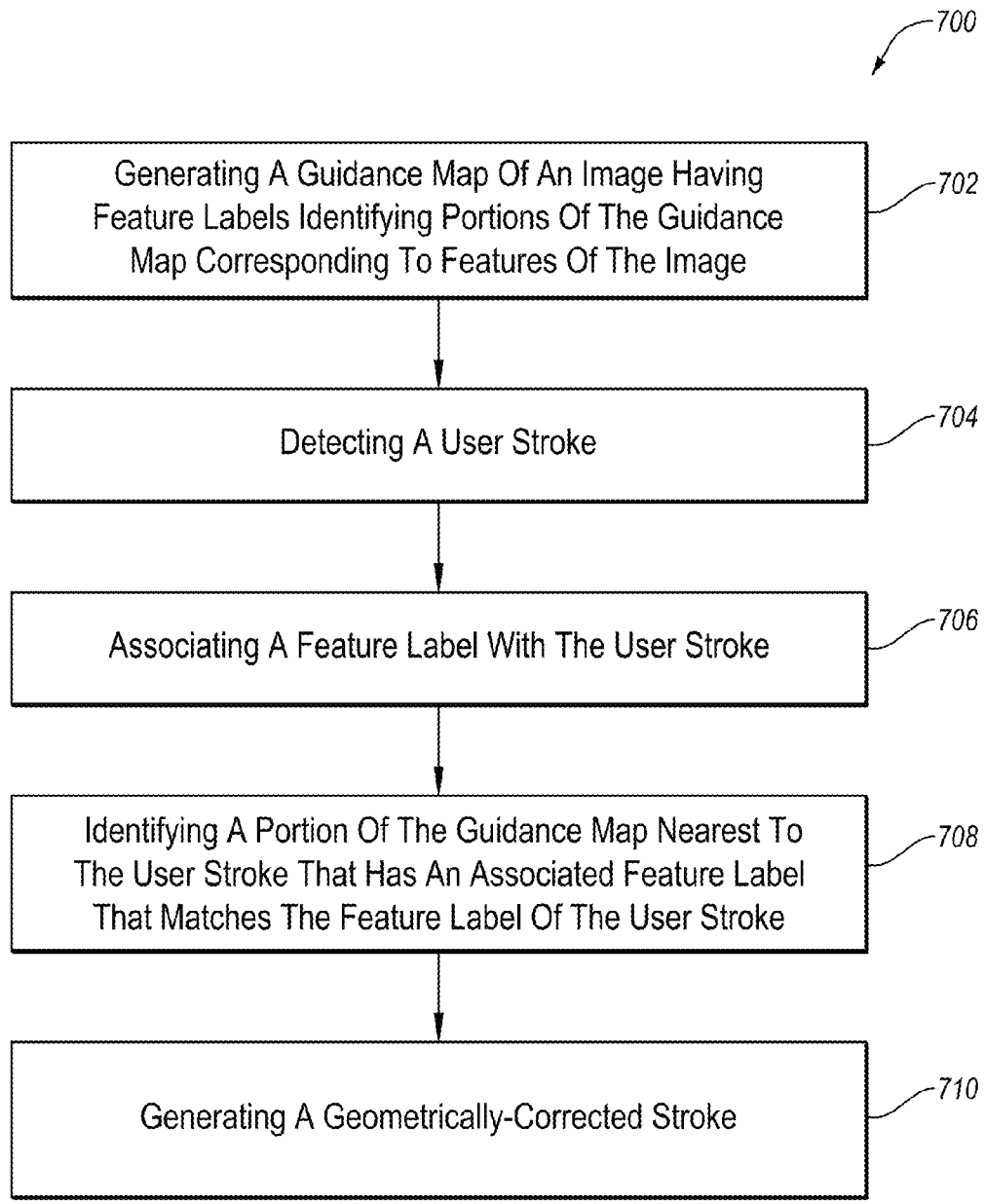
FIG. 7 illustrates a flowchart of a series of acts in a method of providing drawing assistance by geometrically correcting user strokes using semantic labeling in accordance with one or more embodiments of the present invention.
Figure 8:
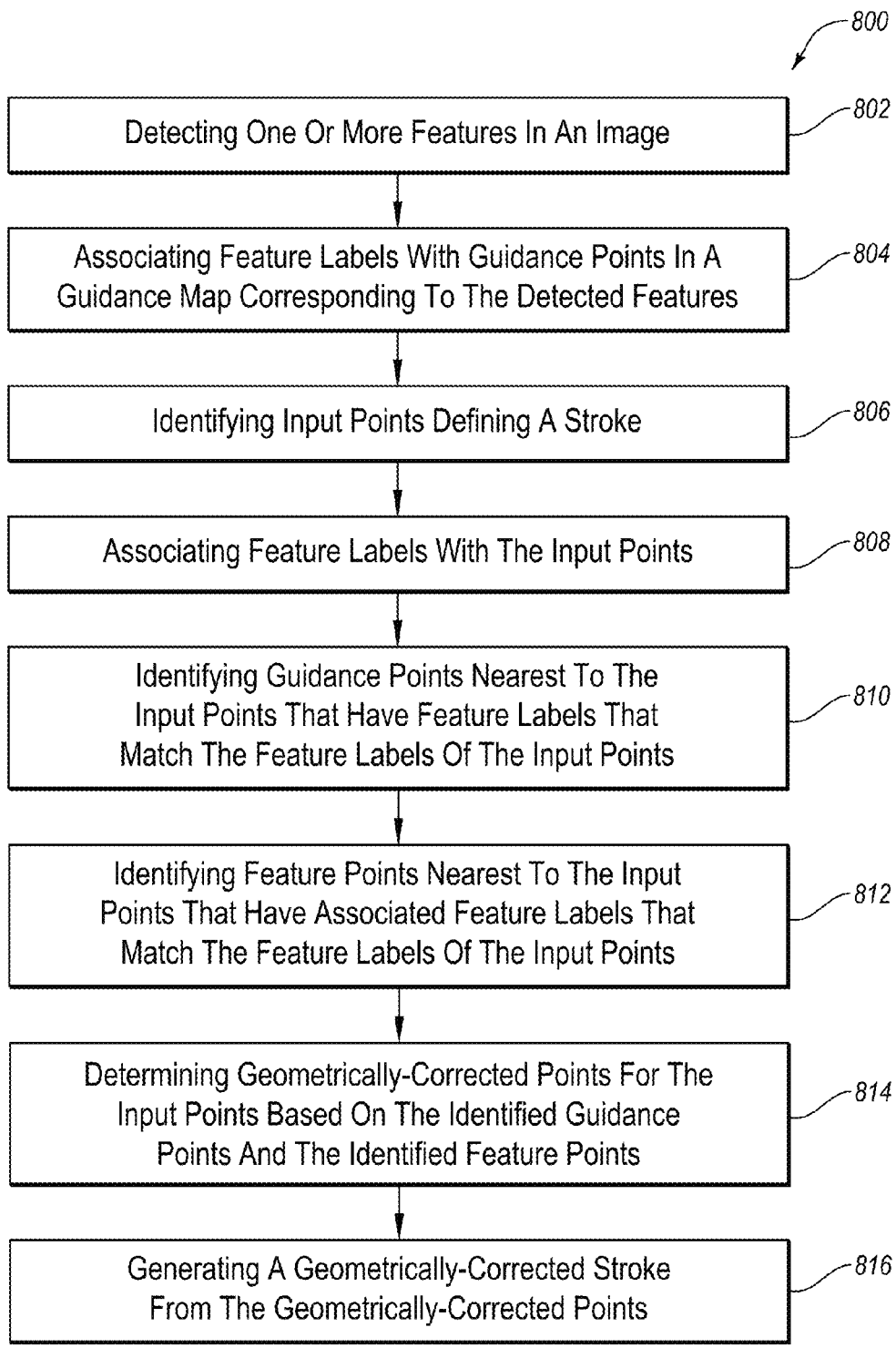
FIG. 8 illustrates a flowchart of a series of acts in another method of providing drawing assistance by geometrically correcting user strokes using semantic labeling in accordance with one or more embodiments of the present invention.

FIG. 7 illustrates a flowchart of one exemplary method 700 of using semantic labeling to provide drawing assistance to a user sketching an image 206, 406. The method 700 includes an act 702 of generating a guidance map for the image that has feature labels identifying portions of the guidance map corresponding to features of the image. In particular, act 702 can involve generating one or more of an edge guidance map 208, 608 and a feature guidance map 213.

For example, act 702 can involve applying an edge detection filter to the image to generate an edge guidance map 208, 608. For example, act 702 can involve applying an extended Difference-of-Gaussians filter to the image 206, 406 to produce an edge guidance map 208, 608 comprising a plurality of edges 222 outlining or otherwise indicating features of the image 206, 406.

Act 702 can further involve identifying one or more features in the image. Act 702 can involve distinguishing different features or different types of features in the image 206, 406 from each other. For example, when the image 206, 406 comprises a face, act 702 can involve applying a face detection algorithm to the image 206, 406 to identify the eyes, the irises, the mouth, the outline of the face, the nose, and the eyebrows. When the image comprises an outdoor scene, act 702 can involve applying a feature detection algorithm to identify the sky, water, mountains, trees, etc. In still further embodiments, act 702 can involve receiving user input identifying features of the image or using a database that identifies user or computer identified features of images.

Act 702 can involve generating a feature guidance map 213, 613 of the image 206, 406 that includes feature labels 211a-211f, 611a-611f that indicate the position of the identified features of the image 206, 406. For example, act 702 can involve filtering the edge guidance map 208, 608 to include only edges 222 with feature labels 211a-211f, 611a-611f. Act 702 can then involve mirroring edges on each side of a vertical symmetry line 612. Additionally or alternatively, act 702 can involve using determined feature points in the image 206 to define the feature guidance map 213, 613. For example, act 702 can fit a line 214 to the feature points and then use the results as a feature guidance map 213, 613.

Act 702 can involve using the feature guidance map 213 to provide semantic labeling of the edge guidance map 208, 608, supplement the edge guidance map 208, 608 when missing edges corresponding to one or more features of the image 206, and/or as a stand alone guidance map. Additionally, act 702 can involve associating feature labels with edges in the edge guidance map corresponding to the identified features. For example, act 702 can involve comparing the features identified in the image 206, 406 to the edge guidance map 208, 608 and associating labels 211a-211f, 611a-611f with edges 222 of the edge guidance map 208, 608 corresponding to the identified features. In particular, act 702 can involve segmenting the edge guidance map 208, 608 using a Markov Random Field, Graph Partition, or nearest neighbor searching algorithm. Act 702 can further involve identifying an edge 222 nearest to a feature identified from the image 206, 406 and associating the feature label 211a-211f, 611a-611f of the feature with the identified edge as shown in FIGS. 2D and 6D.

The method 700 includes an act 704 of detecting a stroke 216, 218 drawn by a user. In particular, act 704 can involve detecting activation and movement of an input device (e.g., a mouse, touch screen, or trackpad). Act 704 can also involve detecting a starting point of the stroke 216, 218, direction of travel of the stroke 216, 218, and an ending point for the stroke 216, 218. Act 702 can further involve detecting a position and a curvature of the stroke 216, 218.

FIG. 7 illustrators that the method 700 includes an act 706 of associating a feature label with the stroke. For example, act 706 can involve comparing the features identified in the image 206, 406 to the stroke 216, 218 and associating with the stroke 216, 218a feature label 211a-211f, 611a-611f of the feature to which the stroke 216, 218 corresponds. For example, act 706 can further involve identifying the feature nearest to the stroke 216, 218b and associating the feature label 211a-211f, 611a-611f of the feature with the stroke 216, 218.

In addition, the method 700 includes an act 708 of identifying a portion of the guidance map nearest to the stroke 216, 218 that has an associated feature label 211a-211f, 611a-611f that matches the feature label 211a-211f, 611a-611f of the stroke 216, 218. For example, act 708 can involve identifying an edge 222 of the edge guidance map 208, 608 nearest to the stroke 216, 218 that has the same feature label 211a-211f, 611a-611f as the stroke 216, 218. More specifically, act 708 can involve determining the edge 222 of the edge guidance map 208, 608 nearest to the stroke 216, 218 in distance and curvature that includes a matching feature label 211a-211f, 611a-611f.

Alternatively or additionally, act 708 can involve identifying a line 214 of the feature guidance map 213, 613 nearest to the stroke 216, 218 that has an associated feature label 211a-211f, 611a-611f that matches the feature label 211a-211f, 611a-611f of the stroke 216, 218. More specifically, act 708 can involve determining the line 214 of the feature guidance map 213, 613 nearest to the stroke 216, 218 in distance and curvature that includes a matching feature label 211a-211f, 611a-611f.

FIG. 7 further illustrates that the method 700 includes an act 710 of generating a geometrically-corrected stroke using the identified portion of the guidance map. For example, act 710 can involve generating a geometrically-corrected stroke 224, 226 by moving, repositioning, or reshaping the stroke 216, 218 using the identified edge 222 of the edge guidance map 208, 608 nearest to the stroke 216, 218 that has an associated feature label 211a-211f, 611a-611f that matches the feature label 211a-211f, 611a-611f of the stroke 216, 218 as a guide. For example, act 710 can involve reducing or minimizing the differences in position and curvature of the stroke 216, 218 from the corresponding edge 222 of the edge guidance map 208, 608. Additionally or alternatively, act 710 can further involve using the identified line 214 of the feature guidance map 213 nearest to the stroke 218 that has an associated feature label 211a that matches the feature label 211a of the stroke 218 in addition to the using the identified edge 222.

In addition to the foregoing, act 710 can involve determining a variation 216a, 216b of the stroke 216 from the identified edge 222 of the edge guidance map 208. In order to maintain the user's style, act 710 can further involve at least partially maintaining the variation 216a, 216b when geometrically correcting the stroke 216. For instance, act 710 can involve reducing a difference between the variation 216a, 216b of the stroke 216 and a variation 224a, 224b of the geometrically-corrected stroke 224.

In addition to the forgoing, method 700 can optionally involve parametrically adjusting the geometrically-corrected stroke. For example, the method 700 can involve determining deviations of the geometrically-corrected stroke 224 from the identified edge 222 of the edge guidance map 208. In particular, method 700 can involve determining differences in position and curvature between the geometrically-corrected stroke 224 and the identified edge 222 of the edge guidance map 208. Furthermore, method 700 can involve parametrically adjusting the geometrically-corrected stroke 224 by emphasizing or de-emphasizing the geometrically-corrected stroke 224 based on the deviations of the geometrically-corrected stroke 224 from the identified edge 222 of the edge guidance map 208. For example, method 700 can involve emphasizing portions 224c of the geometrically-corrected stroke 224 that align with the identified edge 222 and de-emphasizing portions 224a, 224b of the of the geometrically-corrected stroke 224 with deviations from the identified edge 222. Emphasizing portions of the geometrically-corrected stroke 224 can involve increasing one or more of the width, opacity, or density, while de-emphasizing portions of the geometrically-corrected stroke 224 can involve decreasing one or more of the width, opacity, or density.

Method 700 can involve rendering the geometrically-corrected stroke. Method 700 can render the geometrically-corrected stroke 224, 226 as the user draws the stroke 216, 218. In other words, the method 700 can render the geometrically-corrected stroke 224, 226 instead of, or in place of, the rendering the stroke 216, 218. In such embodiments, the drawing assistance system does not render the stroke 216, 218.

Referring now to FIG. 8, a flowchart of another exemplary method 800 of using semantic labeling to provide drawing assistance to a user sketching an image is illustrated. The method 800 also includes an act 802 of detecting one or more features in the image. Act 802 can involve distinguishing different features or different types of features in the image 206, 406 from each other. For example, when the image comprises a face, act 802 can involve applying a face detection algorithm to the image to identify the eyes, the irises, the mouth, the outline of the face, the nose, and the eyebrows. When the image comprises an outdoor scene, act 802 can involve applying a feature detection algorithm to identify the sky, water, mountains, trees, etc. In still further embodiments, act 802 can involve receiving user input identifying features of the image or using a database that identifies user or computer identified features of images. Act 802 can further involve generating or identifying feature points identifying the detected features.

Additionally, the method 800 includes an act 804 of associating feature labels with guidance points in the edge guidance map corresponding to the detected features. For example, act 804 can involve comparing the features detected in the image 206, 406 to the edge guidance map 208, 608 and associating labels 211a-211f, 611a-611f with guidance points $g_i$ of the edge guidance map 208, 608 corresponding to the identified features. In particular, act 804 can involve segmenting the edge guidance map 208, 608 using a Markov Random Field, Graph Partition, or nearest neighbor searching algorithm. Act 804 can further involve performing a nearest neighbor search to identify the nearest feature point $f_i$ for each guidance point $g_i$ of a guidance edge 222. Act 804 can then involve determining which feature label 211a-211f, 611a-611f (based on the nearest feature points $f_i$) was identified for a majority of the guidance points $g_i$ of the guidance edge 222. Act 804 further involves associating the feature label 211a-211f, 611a-611f identified for a majority of the guidance points $g_i$ with each guidance point $g_i$ on the guidance edge 222.

As shown the method 800 includes an act 806 of identifying input points defining a stroke drawn by a user. In particular, act 806 involves identifying input points $x_i$ defining an input stroke 216, 218 drawn by a user over an image 206, 406. More specifically, act 806 can involve analyzing the stroke to identify input points $x_i$ that define the stroke 216, 218. Analyzing the stroke 216, 218 can include sampling or resampling the stroke 216, 218 to identify input stroke points $x_i$. Additionally, analyzing the stroke 216, 218 can include determining a position and a local orientation of the stroke 216, 218 at each of the input points $x_i$.

Additionally, the method 800 includes an act 808 of associating feature labels with the input points. For example, act 808 can involve comparing the features detected in the image 206, 406 to the input points $x_i$ and associating labels 211a-211f, 611a-611f with input points $x_i$ corresponding to the identified features. Act 808 can involve performing a nearest neighbor search to identify the nearest feature point $f_i$ for each input points $x_i$ of a user stroke 216, 218. Act 808 can then involve determining which feature label 211a-211f, 611a-611f (based on the nearest feature points $f_i$) was identified for a majority of the input points $x_i$ of the stroke 216, 218. Act 808 further involves associating the feature label 211a-211f, 611a-611f identified for a majority of the input points $x_i$ with each input points $x_i$ of the input stroke 216, 218.

FIG. 8 illustrates that method 800 includes an act 810 of identifying guidance points of the edge guidance map nearest to the input points of the stroke that have associated feature labels that match the feature labels of the input points of the stroke. For example, act 810 can involve identifying guidance points $g_i$ nearest to the input points $x_i$ that have the same feature label 211a-211f, 611a-611f as the input points $x_i$. More specifically, act 810 can involve determining the guidance points $g_i$ nearest to the input points $x_i$ in distance and curvature that also have associated feature labels 211a-211f, 611a-611f that match the feature labels associated with the input points $x_i$.

Along related lines, method 800 includes an act 812 of identifying feature points nearest to the input points of the stroke that have associated feature labels that match the feature labels of the input points of the stroke. For example, act 812 can involve identifying feature points $f_i$ nearest to the input points $x_i$ that have the same feature label 211a-211f, 611a-611f as the input points $x_i$. More specifically, act 812 can involve determining the feature points $f_i$ nearest to the input points $x_i$ in distance and curvature that also have associated feature labels 211a-211f, 611a-611f that match the feature labels associated with the input points $x_i$.

FIG. 8 further illustrates that method 800 includes an act 814 of determining geometrically-corrected points for the stroke based on the identified guidance points and the identified feature points. In particular, act 814 can involve calculating a position and orientation for geometrically-corrected points $p_i$. Act 814 can involve reducing or minimizing a difference between the geometrically-corrected points $p_i$ and the guidance points $g_i$. Act 814 can involve reducing or minimizing a difference between the geometrically-corrected points $p_i$ and the feature points $f_i$.

Act 806 can further include determining a variation between neighboring input points $x_i$ and reducing a difference between the variation between the neighboring input points $x_i$ and a variation between neighboring geometrically-corrected points $p_i$ corresponding to the neighboring input points $x_i$. Thus, determining geometrically-corrected points $p_i$ can involve both aligning the geometrically-corrected points $p_i$ with the guidance points $g_i$ and feature points $f_i$ while maintaining variations in the stroke 216, 218.

Method 800 additionally includes an act 816 of generating a geometrically-corrected stroke or curve from the geometrically-corrected points. More specifically, act 816 involves generating a geometrically-corrected stroke or curve 224, 226 by fitting a line to the geometrically-corrected points $p_i$. For example, act 816 can involve fitting the geometrically-corrected points $p_i$ with a cubic B-spline curve approximation or using a least squares regression technique or another line fitting algorithm.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. In certain particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the invention can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general purpose computer to turn the general purpose computer into a special purpose computer implementing elements of the invention. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
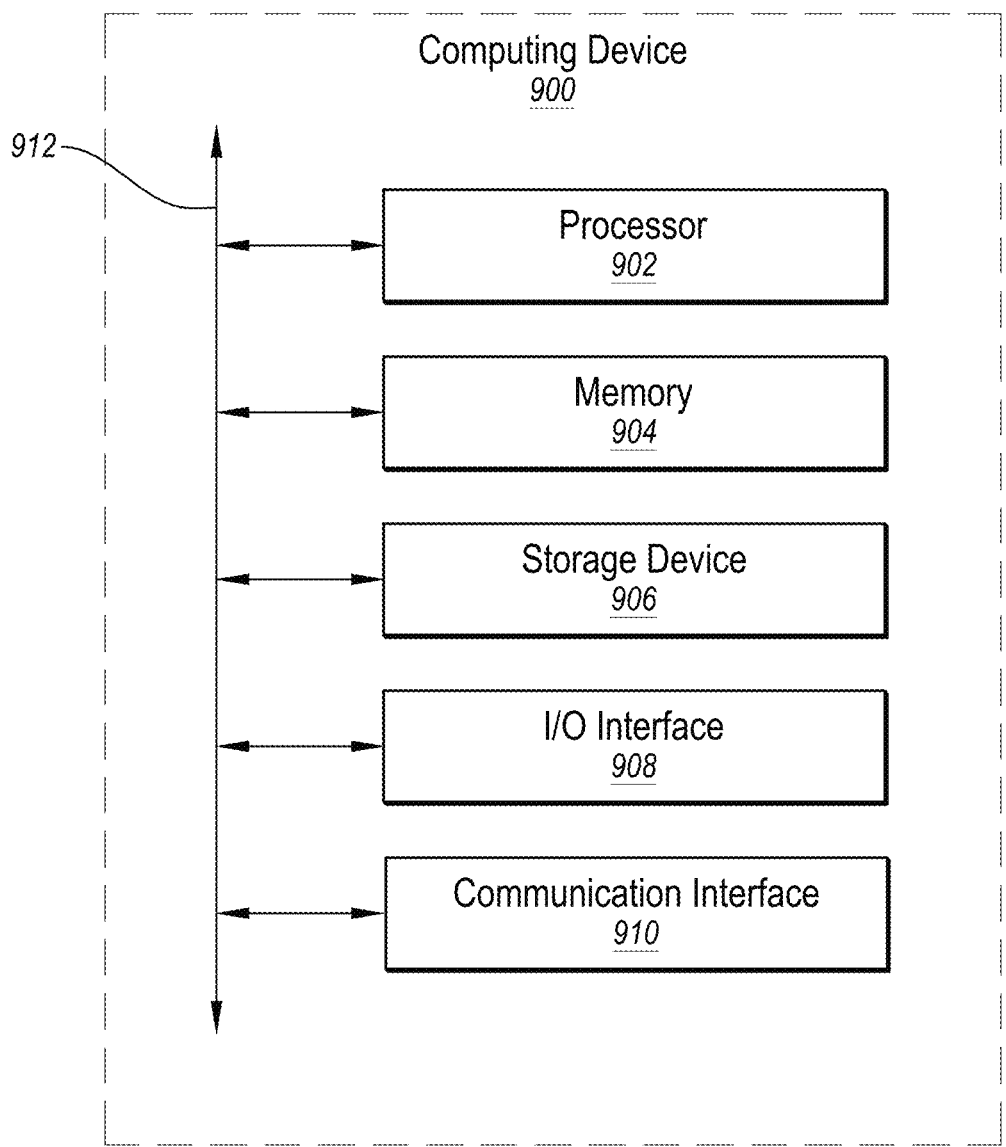
FIG. 9 illustrates a block diagram of an exemplary computing device in accordance with one or more embodiments of the present invention.

FIG. 9 illustrates, in block diagram form, an exemplary computing device 900 that may be configured to perform one or more of the processes described above. One will appreciate that the client device 118 (or even the server device 120) can comprise implementations of the computing device 900. As shown by FIG. 9, the computing device can comprise a processor 902, memory 904, a storage device 906, an I/O interface 908, and a communication interface 910. While an exemplary computing device 900 is shown in FIG. 9, the components illustrated in FIG. 9 are not intended to be limiting. Additional or alternative components may be used in other embodiments. Furthermore, in certain embodiments, a computing device 900 can include fewer components than those shown in FIG. 9. Components of computing device 900 shown in FIG. 9 will now be described in additional detail.

In particular embodiments, processor(s) 902 includes hardware for executing instructions, such as those making up a computer program. As an example and not by way of limitation, to execute instructions, processor(s) 902 may retrieve (or fetch) the instructions from an internal register, an internal cache, memory 904, or a storage device 906 and decode and execute them. In particular embodiments, processor(s) 902 may include one or more internal caches for data, instructions, or addresses. As an example and not by way of limitation, processor(s) 902 may include one or more instruction caches, one or more data caches, and one or more translation lookaside buffers (TLBs). Instructions in the instruction caches may be copies of instructions in memory 904 or storage 906.

The computing device 900 includes memory 904, which is coupled to the processor(s) 902. The memory 904 may be used for storing data, metadata, and programs for execution by the processor(s). The memory 904 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 904 may be internal or distributed memory.

The computing device 900 includes a storage device 906 includes storage for storing data or instructions. As an example and not by way of limitation, storage device 906 can comprise a non-transitory storage medium described above. The storage device 906 may include a hard disk drive (HDD), a floppy disk drive, flash memory, an optical disc, a magneto-optical disc, magnetic tape, or a Universal Serial Bus (USB) drive or a combination of two or more of these. Storage device 906 may include removable or non-removable (or fixed) media, where appropriate. Storage device 906 may be internal or external to the computing device 900. In particular embodiments, storage device 906 is non-volatile, solid-state memory. In particular embodiments, Storage device 906 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The computing device 900 also includes one or more input or output ("I/O") devices/interfaces 908, which are provided to allow a user to provide input to (such as user strokes), receive output from, and otherwise transfer data to and from the computing device 900. These I/O devices/interfaces 908 may include a mouse, keypad or a keyboard, a touch screen, camera, optical scanner, network interface, modem, other known I/O devices or a combination of such I/O devices/interfaces 908. The touch screen may be activated with a stylus or a finger.

The I/O devices/interfaces 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 908 is configured to provide graphical data to a display for presentation to a user. The graphical data may be representative of one or more graphical user interfaces and/or any other graphical content as may serve a particular implementation.

The computing device 900 can further include a communication interface 910. The communication interface 910 can include hardware, software, or both. The communication interface 910 can provide one or more interfaces for communication (such as, for example, packet-based communication) between the computing device and one or more other computing devices 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI.

This disclosure contemplates any suitable network and any suitable communication interface 910. As an example and not by way of limitation, computing device 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computing system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof. Computing device 900 may include any suitable communication interface 910 for any of these networks, where appropriate.

The computing device 900 can further include a bus 912. The bus 912 can comprise hardware, software, or both that couples components of computing device 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

We claim:

1. A method of using semantic labeling to provide drawing assistance to a user sketching an image comprising:
   generating, by one or more processors of a computing device, a guidance map for the image, the guidance map including feature labels identifying one or more portions of the guidance map corresponding to one or more features of the image;
   detecting a stroke drawn by a user on a touch screen of the computing device;
   associating a feature label with the stroke;
   identifying a portion of the guidance map nearest to the stroke that has an associated feature label that matches the feature label of the stroke;
   generating, by the one or more processors, a geometrically-corrected stroke using the identified portion of the guidance map nearest to the stroke that has the associated feature label that matches the feature label of the stroke; and
   rendering, by the computing device, the geometrically-corrected stroke on the touch screen in place of the stroke drawn by the user.

2. The method as recited in claim 1, wherein generating the guidance map comprises generating an edge guidance map by applying an edge detection filter to the image.

3. The method as recited in claim 2, wherein generating the guidance map further comprises:
   applying a feature detection algorithm to the image to identify one or more features in the image; and
   associating feature labels with edges in the edge guidance map corresponding to the identified features.

4. The method as recited in claim 2, wherein generating the guidance map further comprises generating a feature guidance map by applying a feature detection algorithm to the image to identify one or more features in the image.

5. The method as recited in claim 4, further comprising using the feature guidance map to supplement the edge guidance map by using feature lines of the feature guidance map for missing portions of the edge guidance map.

6. The method as recited in claim 4, wherein generating the geometrically-corrected stroke using the identified portion of the guidance map nearest to the stroke that has the associated feature label that matches the feature label of the stroke comprises:
   determining a feature line of the feature guidance map nearest to the stroke that has the associated feature label that matches the feature label of the stroke;
   determining an edge of the edge guidance map nearest to the stroke that has the associated feature label that matches the feature label of the stroke;
   determining which of the edge or the feature line provides a better guide for the stroke; and
   moving the stroke toward the determined edge or feature line that provides the better guide for the stroke.

7. The method as recited in claim 2, wherein the edge detection filter comprises an extended Difference-of-Gaussians filter.

8. The method as recited in claim 1, wherein generating the guidance map comprises generating a feature guidance map by applying a feature detection algorithm to the image to identify one or more features in the image.

9. The method as recited in claim 7, wherein:
   the image comprises a photograph of a face; and
   applying a feature detection algorithm to the image comprises applying a face detection algorithm to the image.

10. The method as recited in claim 1, further comprising determining deviations of the geometrically-corrected stroke from the identified portion of the guidance map by determining differences in position and curvature between the geometrically-corrected stroke and the identified portion of the guidance map.

11. The method as recited in claim 9, further comprising one or more of:
    de-emphasizing portions of the geometrically-corrected stroke that deviate from the identified portion of the guidance map; or
    emphasizing portions of the geometrically-corrected stroke that align with the identified portion of the guidance map.

12. The method as recited in claim 1, further comprising rendering the geometrically-corrected stroke as the user draws the stroke.

13. The method as recited in claim 1, further comprising:
    determining a variation of the stroke from the identified edge of the guidance map; and
    at least partially maintaining the variation when geometrically correcting the stroke.

14. A system comprising:
    at least one processor; and
    at least one non-transitory computer readable storage medium storing instructions thereon that, when executed by the at least one processor, cause the system to:
    generate a guidance map for the image, the guidance map including feature labels identifying one or more portions of the guidance map corresponding to features of the image;
    detect a stroke drawn by a user on a touch screen;
    associate a feature label with the stroke;
    identify a portion of the guidance map nearest to the stroke that has an associated feature label that matches the feature label of the stroke;
    generate a geometrically-corrected stroke using the stroke toward the identified portion of the guidance map nearest to the stroke that has the associated feature label that matches the feature label of the stroke; and
    render the geometrically-corrected stroke on the touch screen in place of the stroke drawn by the user.

15. The system as recited in claim 14, wherein the instructions, when executed by the at least one processor, cause the system to generate the guidance map for the image by generating one or more of:
- a feature guidance map of the image by applying a feature detection algorithm to the image that identifies positions of one or more features of the image; or
- an edge guidance map of the image by applying an edge detection filter to the image.

16. The system as recited in claim 15, wherein the identified portion of the guidance map nearest to the stroke that has the associated feature label that matches the feature label of the stroke comprises one or more of:
- a line of the feature guidance map nearest to the stroke that has the associated feature label that matches the feature label of the stroke; or
- an edge of the edge guidance map nearest to the stroke that has the associated feature label that matches the feature label of the stroke.

17. The system as recited in claim 15, wherein the instructions, when executed by the at least one processor, further cause the system to:
- determine a first distance of the stroke from the line of the feature guidance map;
- determine a second distance of the stroke from the edge of the guidance map; and
- give weight to the line of the feature guidance map and the edge of the edge guidance map based on the determined first and second distances when generating the geometrically-corrected stroke.

18. A computer-implemented method of using semantic labeling to provide drawing assistance to a user sketching an image comprising:
- detecting one or more features in the image;
- associating feature labels with guidance points in a guidance map corresponding to the detected features;
- identifying input points defining a stroke drawn by the user on a touch screen;
- associating feature labels with the input points of the stroke;
- identifying guidance points of the guidance map nearest to the input points of the stroke that have associated feature labels that match the feature labels of the input points of the stroke;
- identifying feature points nearest to the input points of the stroke that have associated feature labels that match the feature labels of the input points of the stroke;
- determining geometrically-corrected points for the input points based on the identified guidance points and the identified feature points;
- generating a geometrically-corrected stroke by fitting a line to the geometrically-corrected points; and
- rendering the geometrically-corrected stroke on the touch screen in place of the stroke drawn by the user.

19. The method as recited in claim 18, wherein determining the geometrically-corrected points for the input points based on the identified guidance points and the identified feature points comprises:
- reducing a difference in distance and curvature between the geometrically-corrected points and the identified guidance points; and
- reducing a difference in distance and curvature between the geometrically-corrected points and the identified feature points.

20. The method as recited in claim 19, wherein associating feature labels with guidance points in the guidance map corresponding to the detected features comprises:
- performing a nearest neighbor search to identify a nearest feature point for each guidance point of a guidance edge;
- identifying a feature label for each nearest feature point nearest to each guidance point of the guidance edge;
- determining which feature label was identified for a majority of the nearest features points to each guidance point of the guidance edge; and
- associating the feature label identified for the majority of the feature points with each guidance point on the guidance edge.

* * * * *